US012762618B2

United States Patent

(12) United States Patent
Pellinger et al.

(10) Patent No.: US 12,762,618 B2
(45) Date of Patent: *Oct. 13, 2026

(54) USER INTERFACE FUNCTIONALITY AND ENHANCEMENTS FOR COMMODITY PRICING ARRANGEMENTS

(71) Applicant: Cargill, Incorporated, Wayzata, MN (US)

(72) Inventors: David Matthew Pellinger, Plymouth, MN (US); Jeff Klock, Browerville, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/240,592

(22) Filed: Jun. 17, 2025

(65) Prior Publication Data

US 2025/0315889 A1 Oct. 9, 2025

Related U.S. Application Data

(63) Continuation of application No. 18/559,963, filed as application No. PCT/US2022/028700 on May 11, 2022, now Pat. No. 12,361,490.

(Continued)

(51) Int. Cl.
*G06Q 40/04* (2012.01)

(52) U.S. Cl.
CPC .................................. *G06Q 40/04* (2013.01)

(58) Field of Classification Search
CPC ...................................................... G06Q 40/04
See application file for complete search history.

(56) References Cited

U.S. PATENT DOCUMENTS 9,813,495 B1 11/2017 Van et al.
10,991,048 B1 4/2021 Blair et al.
(Continued)

FOREIGN PATENT DOCUMENTS

GB 2429808 A * 3/2007 ............. G06Q 40/04
JP 2009-43053 A * 2/2009 ............. G06Q 20/10
(Continued)

OTHER PUBLICATIONS

Smith et al.: Playing with fire: the risks and strategies of derivatives trading, Aug. 2015, The Business and Management Review, vol. 6, No. 4, pp. 313-320. (Year: 2015).*
(Continued)

*Primary Examiner* — Bijendra K Shrestha

(57) ABSTRACT

Disclosed are various data processing systems, user interfaces, application programming interfaces, and related operations for commodity financial data processing scenarios. In some implementations, a system may provide a graphical user interface (GUI) to customize a financial strategy associated with a commodity delivery contract. The GUI may include an interactive graph representation having a vertical axis and a horizontal axis, with the vertical axis corresponding to price values and the horizontal axis corresponding to time values of the financial strategy. The interactive graph representation may provide a vertical user interface control which is capable of horizontal movement to select a time value, and a horizontal user interface control which is capable of vertical movement to select a price value of the financial strategy. An accompanying information display of the GUI may display the time value and the price value and related information obtained for the strategy.

20 Claims, 34 Drawing Sheets

Related U.S. Application Data

(60) Provisional application No. 63/188,538, filed on May 14, 2021.

(56) References Cited

U.S. PATENT DOCUMENTS

| | | | | |
|---|---|---|---|---|
| 2007/0100651 | A1 | 5/2007 | Ramer et al. | |
| 2010/0217702 | A1 * | 8/2010 | Tu | G06Q 40/04 705/37 |
| 2011/0251942 | A1 * | 10/2011 | Rosenthal | G06Q 40/04 705/37 |
| 2013/0138577 | A1 | 5/2013 | Sisk | |
| 2013/0218884 | A1 | 8/2013 | Mcconnell et al. | |
| 2015/0120389 | A1 | 4/2015 | Zhang et al. | |
| 2015/0178833 | A1 | 6/2015 | Kerpel et al. | |
| 2016/0063580 | A1 | 3/2016 | Greenberg et al. | |
| 2018/0373696 | A1 | 12/2018 | Terry et al. | |
| 2019/0095976 | A1 | 3/2019 | Stubbs | |
| 2020/0159829 | A1 | 5/2020 | Zhao et al. | |
| 2021/0042767 | A1 | 2/2021 | Guan et al. | |
| 2021/0049628 | A1 | 2/2021 | Baird | |
| 2021/0125204 | A1 | 4/2021 | Adibi | |
| 2024/0242240 | A1 | 7/2024 | Bofenkamp et al. | |

FOREIGN PATENT DOCUMENTS

| | | | |
|---|---|---|---|
| JP | 2009-043053 | A | 2/2009 |
| WO | 2014/118642 | A2 | 8/2014 |
| WO | 2022/240937 | A1 | 11/2022 |

OTHER PUBLICATIONS

Darden et al.: Modified Momentum Strategies in Commodity Future Markets, Apr. 24, 2009, IEEE, pp. 218-222 (Year: 2009).*

Barbaglia et al.: Volatility spillovers in commodity markets: A large t-vector autoregressive approach, 2020, Energy Economics, 85, pp. 1-11. (Year: 2020).

Cesari et al.: Effective Trade Execution, Jun. 2012, University of Bologna, Italy, pp. 1-29 (Year: 2012).

* cited by examiner

USER INTERFACE FUNCTIONALITY AND ENHANCEMENTS FOR COMMODITY PRICING ARRANGEMENTS

CROSS-REFERENCE TO RELATED APPLICATIONS

This application is a continuation of U.S. patent application Ser. No. 18/559,963, filed Nov. 9, 2023, which is a national phase application of PCT Application No. PCT/US2022/028700, filed May 11, 2022, which claims the benefit of U.S. Provisional Application No. 63/188,538, filed May 14, 2021, each of which is incorporated by reference herein in its entirety.

BACKGROUND

A variety of sales and delivery contracts and associated financial instruments and derivatives (such as futures contracts, options contracts, etc.) are often coordinated for the sale of a commodity. For example, a contract may be set up with a grain producer to schedule the delivery of a commodity (e.g., to have the grain producer deliver a certain number of bushels of corn), at a certain date and that is tied to the price of a traded futures contract (e.g., the July futures contract traded at the Chicago Mercantile Exchange). This sales contract may be linked with different pricing approaches to establish hedging or speculative positions in association with the delivery of the commodity. For example, a commodity delivery contract may include variability on price which may be tied to some derivative instrument (e.g., calls or puts on futures contracts) associated with the commodity. One use of a derivative instrument may allow a grain producer to be guaranteed some minimum price at a scheduled future delivery date, while capturing an upside if the commodity futures price increases between the current date and the scheduled future delivery date.

Often, the process of establishing a commodity delivery contract that is tied to a derivatives pricing component requires two steps and the use of two computing systems: a first process with a first computing system to establish or modify an electronic contract for the delivery and sale of the commodity, and a second process with a second computing system to establish the derivative position (including, process steps to obtain quotes for the derivative position, and then to execute and establish the short or long position in a market). This is subject to a high risk of errors, especially since the pricing of the derivative position is based on real-time markets and has a short window for locking in a price.

Additionally, complexity may arise for many types of users due to the complex nature and many permutations of hedging and speculation strategies available for commodities. The combination of different futures contracts, delivery windows, put and call options, and custom delivery or contract solutions can be very complicated to identify and explain, even for skilled market participants. As a result, some transactions and complex delivery contracts are unable to be executed or identified in real time for commodity producers and traders.

DETAILED DESCRIPTION

Figure 1:
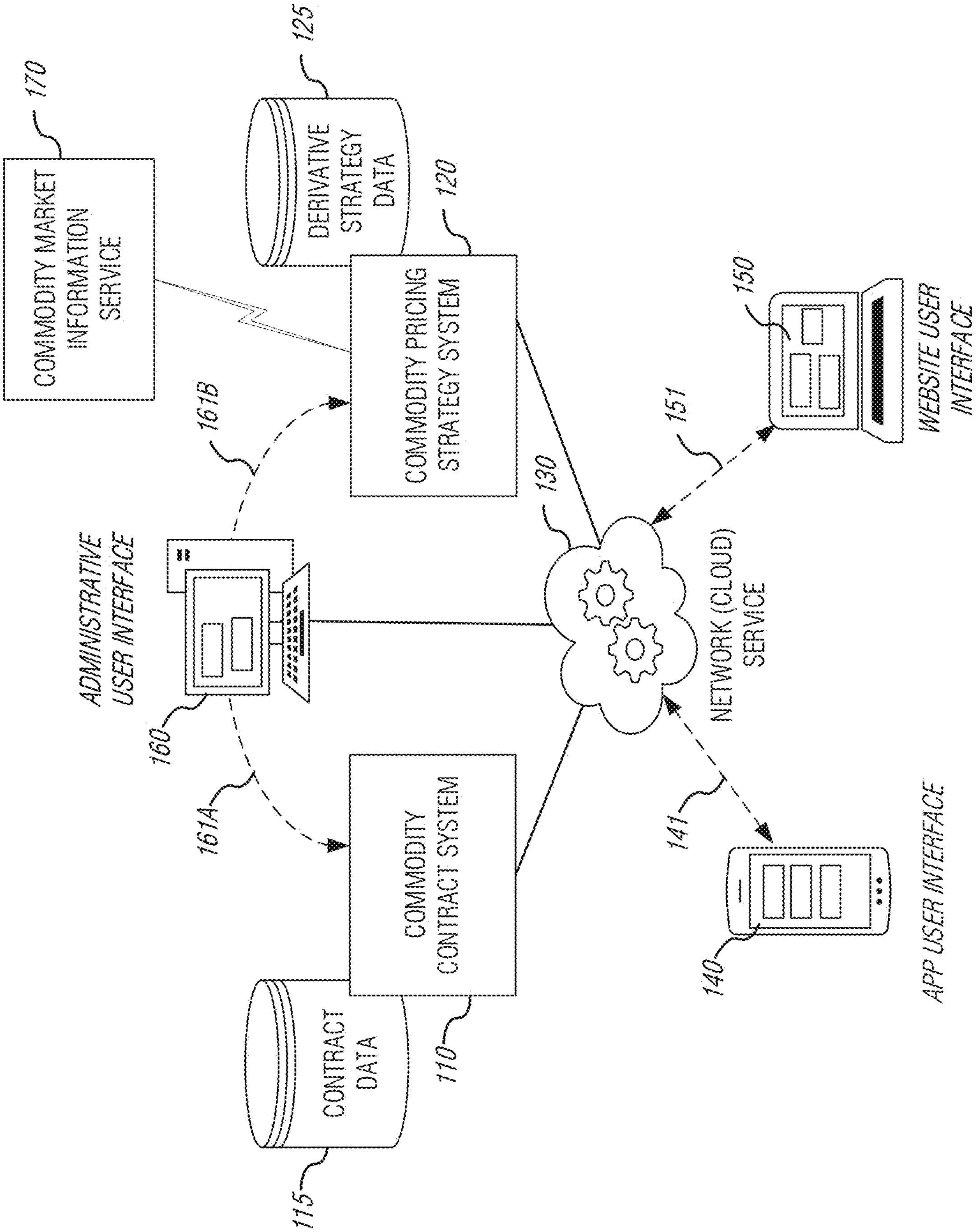
FIG. 1 illustrates user interfaces and interactions provided among commodity contract and pricing strategy systems, according to an example.

The following provides a description of data processing systems, user interfaces, application programming interfaces, and other aspects of computer-controlled and coordinated features for commodity financial data processing scenarios. In specific examples, user interface functionality is provided to enable a simplified and visual quoting feature for complex commodity pricing strategies, such as for price quotes and pricing strategies that are tied to futures, options, delivery contracts, and the like. Such user interface functionality may be used to quote, select, create, or update complex financial products, through a visual arrangement which allows multiple dimensions of data constraints (such as price, time, delivery contract details, futures contract details, derivative product details) to be visualized and interacted with.

The user interface functionality discussed herein enables the simultaneous access and use of two financial data processing systems: a commodity contract system (e.g., a system used for booking and maintaining commodity sales or delivery contracts) and a commodity pricing strategy system (e.g., a system used for booking and maintaining complex pricing strategies that are typically based on commodity derivatives). Instead of requiring separate user interfaces for each of the commodity contract and commodity pricing strategy systems, a single user interface provides capabilities to jointly obtain information and perform transactions with these two systems.

The user interface functionality discussed herein also may invoke automated approaches to simultaneously display, overlay, and combine information from these separate systems into new visual representations. Such visual representations can be interacted with (e.g., selected, modified, adjusted, activated, etc.) by a user, to either create a new commodity contract with a new pricing strategy, or to link an existing commodity contract to a new pricing strategy. Such functionality removes the need for manual double data entry within the separate systems, or manual human intervention to link or combine data, thus reducing the chances of errors, or incomplete information. In further examples, the user interface functionality allows the creation (or updates) of multiple contracts and pricing strategies, which can be applied to one or multiple accounts. Thus, the user interface functionality provides robust tools which allows customers, brokers and salespersons, administrators, and other parties to quickly lock-in real-time pricing strategies from a market for single or multiple contracts, accounts, and orders.

A variety of technical mechanisms are disclosed for the present systems and methods. These include: dynamic user interfaces which provide unique data representations, interactions, adaptations, inputs and outputs; client or server computer systems to implement interactive displays and outputs of the dynamic user interfaces, including to receive and send data, to perform commands, and to accomplish other functional operations associated with the pricing strategies and financial products; cloud services to host and execute instances of application programming instances, to maintain and serve data from operational data stores, and to invoke other computer systems; coordination of computer systems (such as separate commodity contract and commodity pricing strategy computer systems) to execute or update specific pricing arrangements and data processing operations; and the like. Among other features, the technical and real-world benefits of these systems includes: improved automation and accuracy of current real-time (e.g., not delayed) market information; improved verification of data entry and data selection mechanisms; performance of multiple data operations in real-time, including the immediate selection and activation of pricing strategies and financial products that are not be possible from manual human activity; and improved accuracy in data operations, leading to reduced rates of error, reduced data retransmission, reductions in remedial or corrective measures, and efficiency in processing operations.

The following examples are discussed with reference to various types of commodity contracts and derivatives, and specifically, to grain contracts, grain futures contracts, and related derivatives. It will be understood, however, that the techniques discussed herein may be applicable to a variety of other types of commodities, products, services, and financial derivatives not directly discussed in the following examples.

FIG. 1 illustrates example user interfaces and interactions provided among commodity contract and commodity pricing strategy systems. It will be understood that additional computing systems, data transactions, services, interface, communications, and entities may be involved in such scenarios, which are not illustrated in FIG. 1 for purposes of simplicity.

The commodity contract system 110 is a computing system which is responsible for executing software instructions and logic to create, update, cancel, and otherwise manage aspects of commodity delivery or sales contracts. One or multiple commodity delivery or sales contracts may be arranged and executed for each customer, such as for a first contract that specifies delivery of a particular quantity of the commodity at a particular time (e.g., 10,000 bushels for delivery by September 30) and a second contract that specifies the same or different delivery of a particular quantity of the same or different commodity at a particular time (e.g., 5,000 bushels for delivery by October 31). The information for such contracts (e.g., commodity delivery details, agreed prices, contract conditions, pricing strategy linking information, etc.) is maintained in a delivery contract data store 115, which may be provided by a database or any number of data storage, data warehouse, or data hosting systems and hardware. In some examples, the contracts may be contingent or specify certain sales or delivery conditions; this is broadly referred to herein as a "delivery" contract even though physical delivery of the commodity may not occur.

The commodity pricing strategy system 120 is a computing system which is responsible for executing software instructions and logic to create, update, cancel, and otherwise manage aspects of pricing strategies that are associated with a sale or delivery of a commodity. These pricing strategies may be initially or later tied to the commodity contracts (at substantially the same time the commodity contract is created, or at a later time or date). For example, a pricing strategy may be arranged and executed for each customer, which uses a derivative instrument to guarantee a minimum price for delivery of a particular quantity of the commodity at a particular time (e.g., 10,000 bushels for delivery by September 30, to have a guaranteed minimum price of $3.50/bushel, as secured with an options contract associated with a commodity futures contract). The information for executed pricing strategies (e.g., quotes, agreed prices, pricing strategy conditions, contract linking information, etc.) is maintained in a derivative strategy data store 125, which may be provided by a database or any number of data storage, data warehouse, or data hosting systems and hardware. In some examples, the pricing strategies may be contingent or be linked to certain financial derivatives and market, sale, or delivery conditions; this is broadly referred to herein as a "pricing strategy" even though one or multiple derivatives, contracts, conditions, and contingencies may be involved.

The commodity pricing strategy system 120 may obtain market pricing information from a commodity market information service 170. For example, such pricing information may include current futures contracts prices, option contracts prices, and market prices, bid prices, ask prices, transaction information, and related information, which is used to determine the cost or parameters of the pricing strategy. For instance, such pricing information may be sourced from commodity futures prices or options prices from commodity markets such as the Chicago Mercantile Exchange, Chicago Board of Trade, New York Mercantile Exchange, Minneapolis Grain Exchange, Kansas City Board of Trade, among others.

The presently disclosed user interfaces, such as those discussed below, may be hosted or facilitated through a networked cloud service 130. As an example, user interfaces may be provided via a web site hosted at the cloud service 130, as respective client computers access a website user interface 150 served from the cloud service 130. Such access between the website user interface 150 and the cloud service 130 may be provided in a synchronous or asynchronous manner via data connection 151. As another example, the user interfaces may be provided via an app user interface 140 provided in a software application (app) that is installed on a client computing device such as a smartphone, as respective smartphones install the app user interface 140 and access data via one or more application programming interfaces of the cloud service 130. Likewise, the access between the app user interface 140 and the cloud service 130 may be provided in a synchronous or asynchronous manner via data connection 141. Other forms or types of dynamic and distributed user interfaces, including those which distribute features among the client and server, are also possible. Such user interfaces may include functionality or limitations for use by customers (e.g., commodity producers), or salespersons (e.g., brokers, customer account managers, traders, etc.), or other relevant entities.

An administrative user interface 160 may be provided that is accessible on a computing system operated by an authorized user (e.g., broker, salesperson, trader, administrator, etc.). This user interface 160 may perform separate transactions with the systems 110, 120 via connections 161A, 161B. However, this user interface may also perform actions with the cloud service 130, in a similar manner as provided with the app user interface 140 and the website user interface 150. For example, the cloud service 130 may provide administrative functions which enable auditing, modification, notifications, and configuration of the commodity contracts, pricing strategies, or features of the user interfaces 140, 150.

Figure 2A:
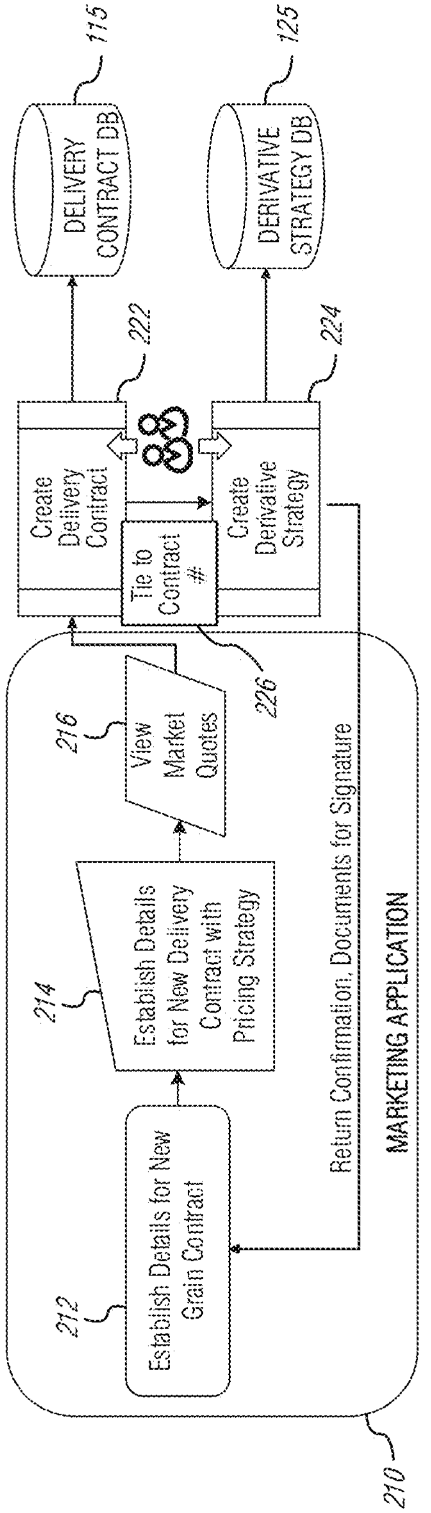
FIGS. 2A and 2B illustrate block diagrams of functional operations used in a commodity marketing application, for establishing and updating commodity delivery contracts and commodity derivative strategies, according to an example.
Figure 2B:
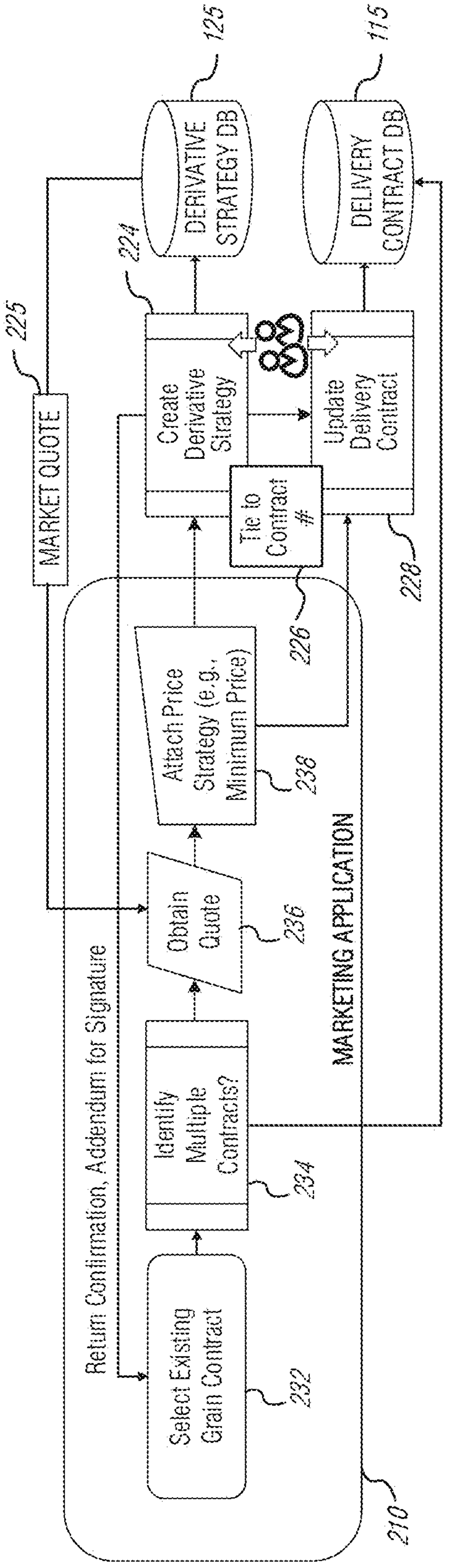

FIGS. 2A and 2B illustrate block diagrams of example functional operations used in a commodity marketing application, for establishing commodity delivery contracts and commodity derivative strategies (shown in FIG. 2A) and for updating commodity delivery contracts and commodity derivative strategies (shown in FIG. 2B). Here, such functional operations are coordinated through the use of a marketing application 210. The marketing application 210 may be implemented by logic at the cloud service 130, as aspects of the commodity contract system 110 and commodity pricing strategy system 120 are invoked.

In FIG. 2A, a scenario is shown for the creation of a grain delivery contract with a pricing strategy. Within marketing application 210, functions are performed to collect contract details for a new grain contract 212, for a scenario where a new delivery contract is created. This is followed by collecting details for the new delivery contract based on the characteristics of a proposed pricing strategy 214 (e.g., by identifying a proposed pricing strategy product which provides a minimum or guaranteed price for the proposed contracted grain delivery).

Within the marketing application 210, marketing quotes 216 are displayed to a user, and user interactivity is provided to allow selection and modification of the details for the proposed pricing strategy. Additional user interface functionality may be provided to refresh quotes, indicate warnings or errors, provide confirmation of transactions, obtain documents for signature, and collect additional information, such as is included with the graphical user interfaces of FIGS. 7A to 10G, discussed below.

Upon selection and confirmation in the user interface of a market quote for a component of the pricing strategy, the marketing application 210 causes creation of the delivery contract 220 in the delivery contract data store 115 (e.g., via transactions performed with the commodity contract system 110). The marketing application 210 also may cause creation or selection of the derivative strategy 224 in the derivative strategy data store 125 (e.g., via transactions performed with the commodity pricing strategy system 120). Finally, the marketing application 210 ties the delivery contract to the derivative strategy 226.

A similar workflow is shown in FIG. 2B for the modification of an existing (e.g., already-created) grain delivery contract. Within marketing application 210, functions are performed to select one or more existing grain contracts 232 for association with a pricing strategy. This selection may include the optional identification of multiple contracts 234, such as in a scenario where the same hedging pricing strategy is intended to be applied among multiple contracts from the same or multiple customers. The identification of multiple contracts 234 may be performed by accessing data in the delivery contract data store 115.

In FIG. 2B, the marketing application 210 proceeds to obtain a quote 236 for current market conditions, based on characteristics of the delivery contract. The user interface functionality then allows the identification, selection, and attachment of a price strategy 238 for the delivery contract (such as selection of a proposed pricing strategy product which provides a minimum or guaranteed price for the established contracted grain delivery). When selected, a derivative price strategy is created with operation 224 (similar to that depicted in FIG. 2A), including the entry of the derivative strategy in derivative strategy data store 125 and transactions performed with the commodity pricing strategy system 120. Then, an update to the delivery contract 228 is performed, to associate the pricing strategy details with the delivery contract in the delivery contract data store 115, and to tie the delivery contract to the derivative strategy 226.

Figure 3:
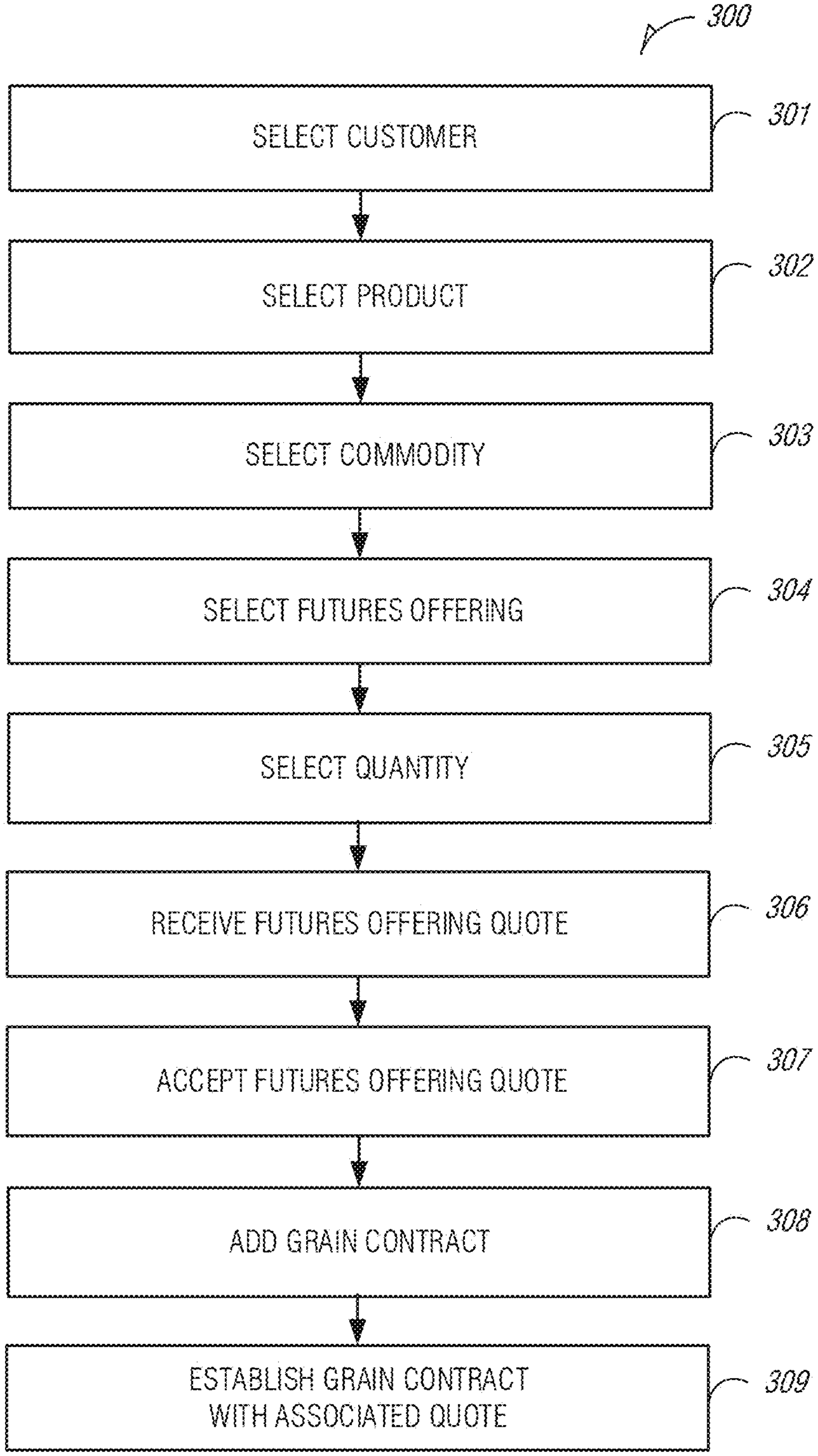
FIGS. 3 and 4 illustrate respective flowcharts of operations, used for establishing and updating commodity delivery contracts and commodity derivative strategies, according to an example.
Figure 4:
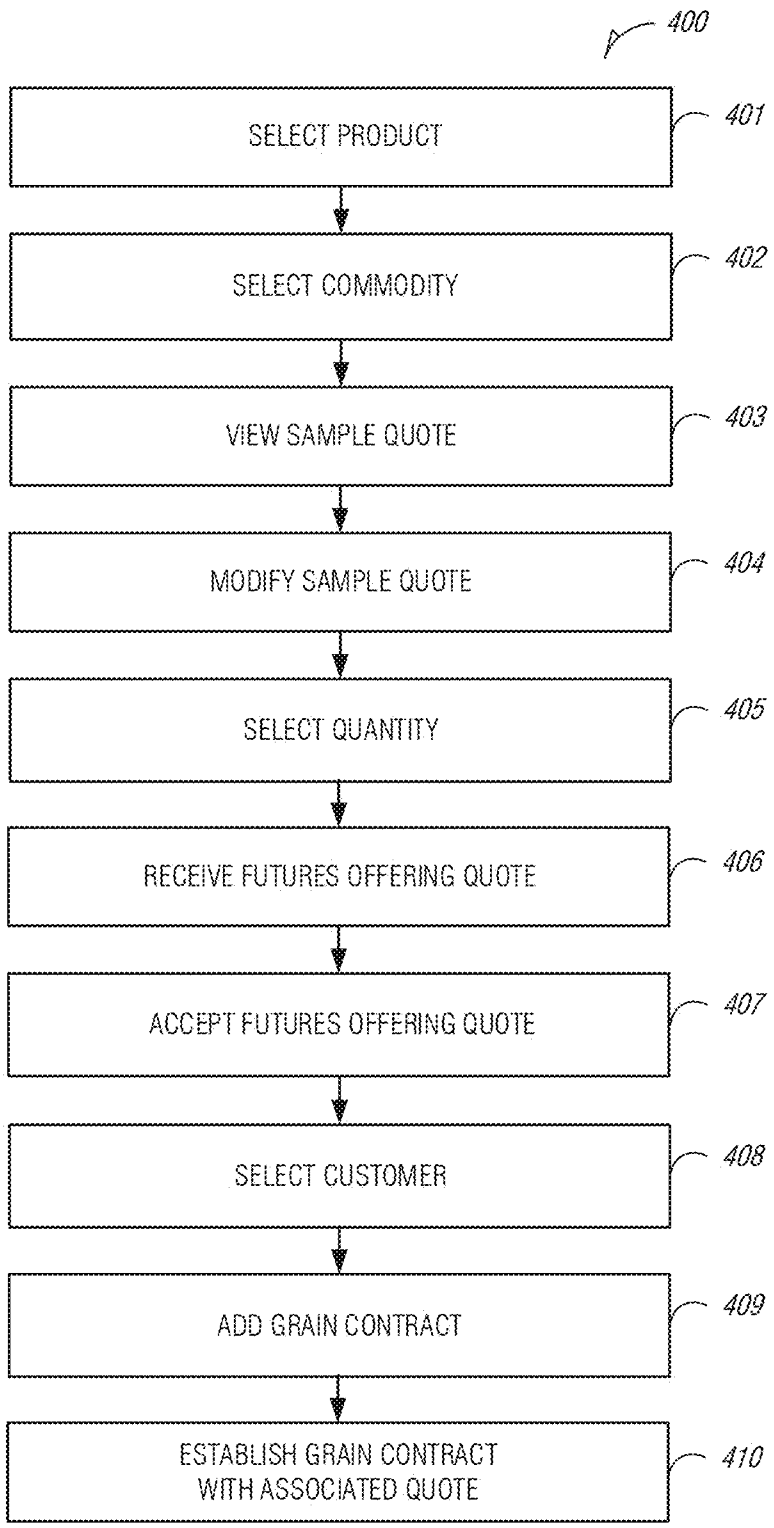

FIGS. 3 and 4 illustrate respective flowcharts of example methods 300, 400, used for establishing and updating commodity delivery contracts and commodity derivative strategies, in connection with the grain contracts and grain pricing strategies discussed herein. These flowcharts provide more detail on the functional operations enabled by user interaction with the user interfaces 140, 150, as operations are performed with the marketing application 210 and the cloud service 130. These flowcharts are structured from the perspective of data transactions that are performed by an end user such as a producer, customer, broker, or marketing agent; however it will be understood that other intermediate actors or systems (and, many other data values) may also be involved.

The flowchart of the method 300 for establishing a new commodity delivery contract and an associated pricing strategy for a customer, with a user interface, includes the following sequence:

At operation 301, a customer is selected. This selection is provided from user interface functionality and marketing application functionality to identify relevant customer accounts and information associated with the customer.

At operation 302, a product is selected. This product may be a pricing strategy that is directly tied to the characteristic of a delivery contract to be established (or, which has already been established). The selection of the product is provided from user interface functionality and marketing application functionality that enables the specification or change of the pricing strategy for the selected customer.

At operation 303, a commodity is selected. This commodity may be any supported type of commodity with associated delivery contracts such as grain commodities (e.g., corn, soybeans, wheat, etc.). The selection of the product is provided from user interface functionality and marketing application functionality that enables the specification or change of the commodity for the selected customer and product type.

At operation 304, a futures offering is selected. This futures offering may be any supported type of futures offering necessary for the product (pricing strategy). The selection of the product is provided from user interface functionality and marketing application functionality that enables the specification or change of the commodity for the selected customer and product type.

At operation 305, a quantity is selected. This quantity may be associated with delivery specifications (e.g., number of bushels) for the associated delivery contract(s). The selection of the quantity is provided from user interface functionality and marketing application functionality that enables the specification or change of the quantity for the selected customer, product type, and futures offering.

At operation 306, a futures offering quote is received, and at operation 307, a futures offering quote is accepted. The receipt, display, and acceptance of the futures offering at the quoted price is provided from user interface functionality and marketing application functionality that enables the futures offering to be accepted at the quoted price for the selected customer, product type, and quantity.

At operation 308, a grain delivery contract may be added in connection with the defined futures offering (e.g., created as a new contract linked to the futures offering, or an existing contract to be linked to the futures offering). The status of this grain delivery contract, and information such as delivery location and other specifications may be provided from user interface functionality and marketing application functionality, via displayed status information, controls, and other user inputs and outputs. At operation 309, the flowchart concludes with the grain contract being established with the associated quote and pricing strategy.

The method 400 follows a similar flow, with the selection of a commodity delivery contract and an associated pricing strategy, followed by an association with a customer. The operations of method 400 includes the following sequence:

At operation 401, a product is selected (such as through the receipt of a user interface input, as discussed with reference to FIG. 3). Operation 401 corresponds to the steps performed for operation 302, but performed independently of a customer account. At operation 402, a commodity is selected (such as through the receipt of a user interface input, as discussed with reference to FIG. 3). Operation 402 corresponds to the steps performed for operation 303, but performed independently of a customer account.

At operation 403, a sample quote is viewed, and at operation 404, a sample quote is modified. This quote is associated with a futures offering, which enables a particular pricing strategy for a futures contact to be established.

At operation 405, a quantity is selected. Operation 405 corresponds to the steps performed for operation 305, but performed independently of a customer account.

At operation 406, a futures offering quote is received, and at operation 407, a futures offering quote is accepted. Operation 406 corresponds to the steps performed for operation 306 and operation 407 corresponds to the steps performed for operation 307, but performed independently of a customer account.

At operation 408, a customer is selected, for association with the defined pricing strategy. The functionality provided here is similar to that of operation 301, but performed once the pricing strategy is defined.

At operation 409, a grain delivery contract may be added in connection with the defined futures offering. Operation 409 corresponds to the steps performed for operation 308. At operation 410, the flowchart concludes with the grain contract being established with the associated quote and pricing strategy. Operation 410 corresponds to the steps performed for operation 309.

Figure 5:
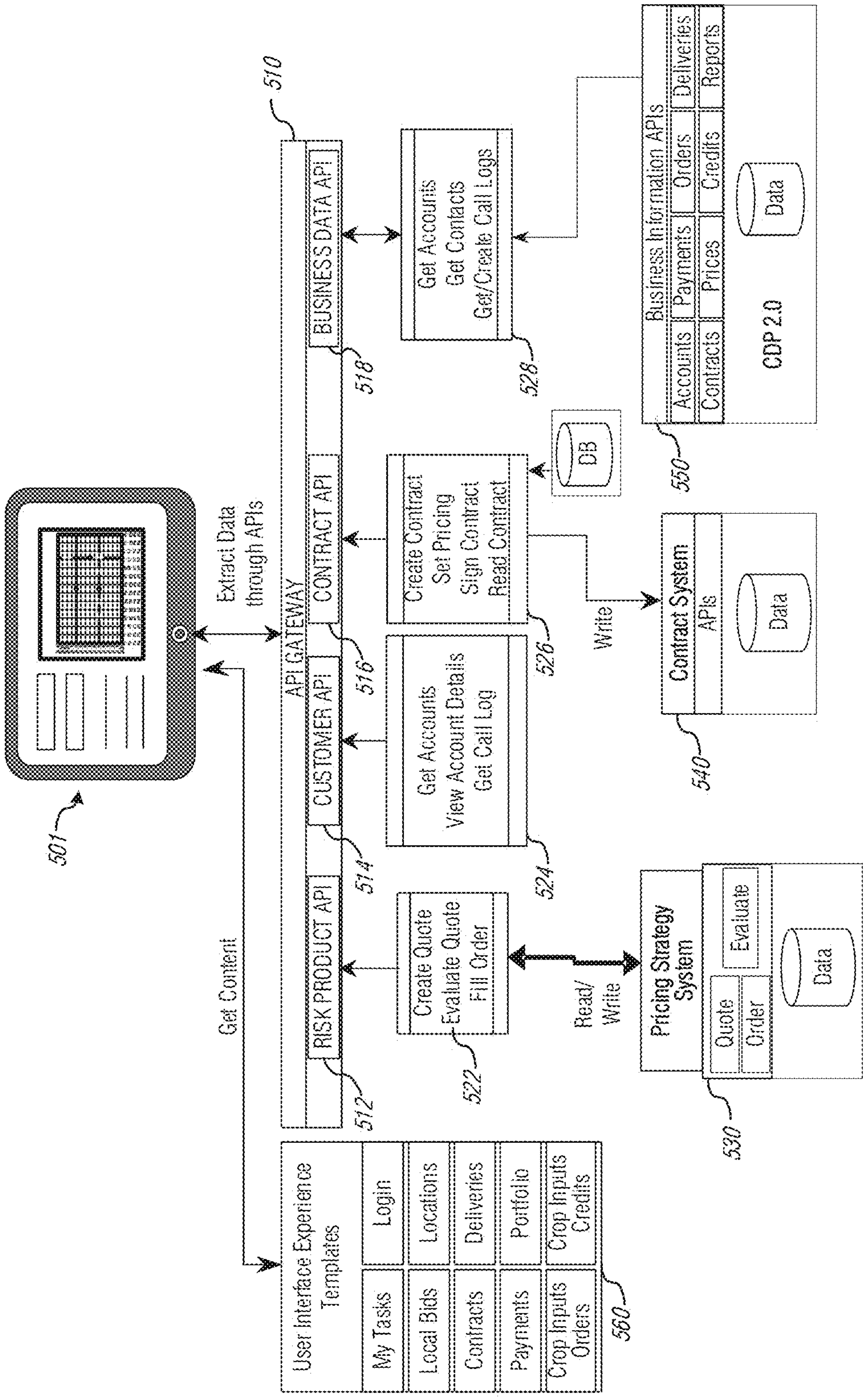
FIG. 5 illustrates a configuration of application programming interfaces, used for establishing and updating commodity delivery contracts and commodity derivative strategies, according to an example.

FIG. 5 illustrates an example configuration of application programming interfaces, used for establishing and updating commodity delivery contracts and commodity derivative strategies. Here, a graphical user interface 501 (e.g., an implementation of the app user interface 140) may perform the following data operations. As will be understood, these data operations may correspond to the operations depicted among FIGS. 1 to 4.

The graphical user interface 501 may provide user interface functionality according to one or more templates 560. For instance, the templates 560 depicted in FIG. 5 include functionality for viewing and interacting with information for: Tasks, Login, Bids, Locations, Contracts, Deliveries, Payments, Portfolios, Orders, and Credits. Some features of these templates are depicted among the graphical user interface illustrations of FIGS. 7A to 10G, discussed below.

The graphical user interface 501 accesses an Application Programming Interface (API) gateway 510 to perform data operations with the various commodity delivery contracts and commodity derivative strategies. These gateways may include: a risk product API 512, which performs pricing strategy order functions 522 such as to create quotes, evaluate quotes, and fill orders with a pricing strategy system 530; a customer API 514, which performs account functions 524 such as to obtain account information, view account details, and obtain log information; a contract API 516, which performs contract functions 526 such as to create contracts, set pricing, read contracts, or sign contracts; and a business data API 518, which performs business information functions 528 such as account and contact management, business information logging, and the like. Further, the business information functions 528 may utilize business information APIs 550 such as to obtain information related to: accounts, payments, orders, deliveries, contracts, prices credits, reports, and the like.

Figure 6:
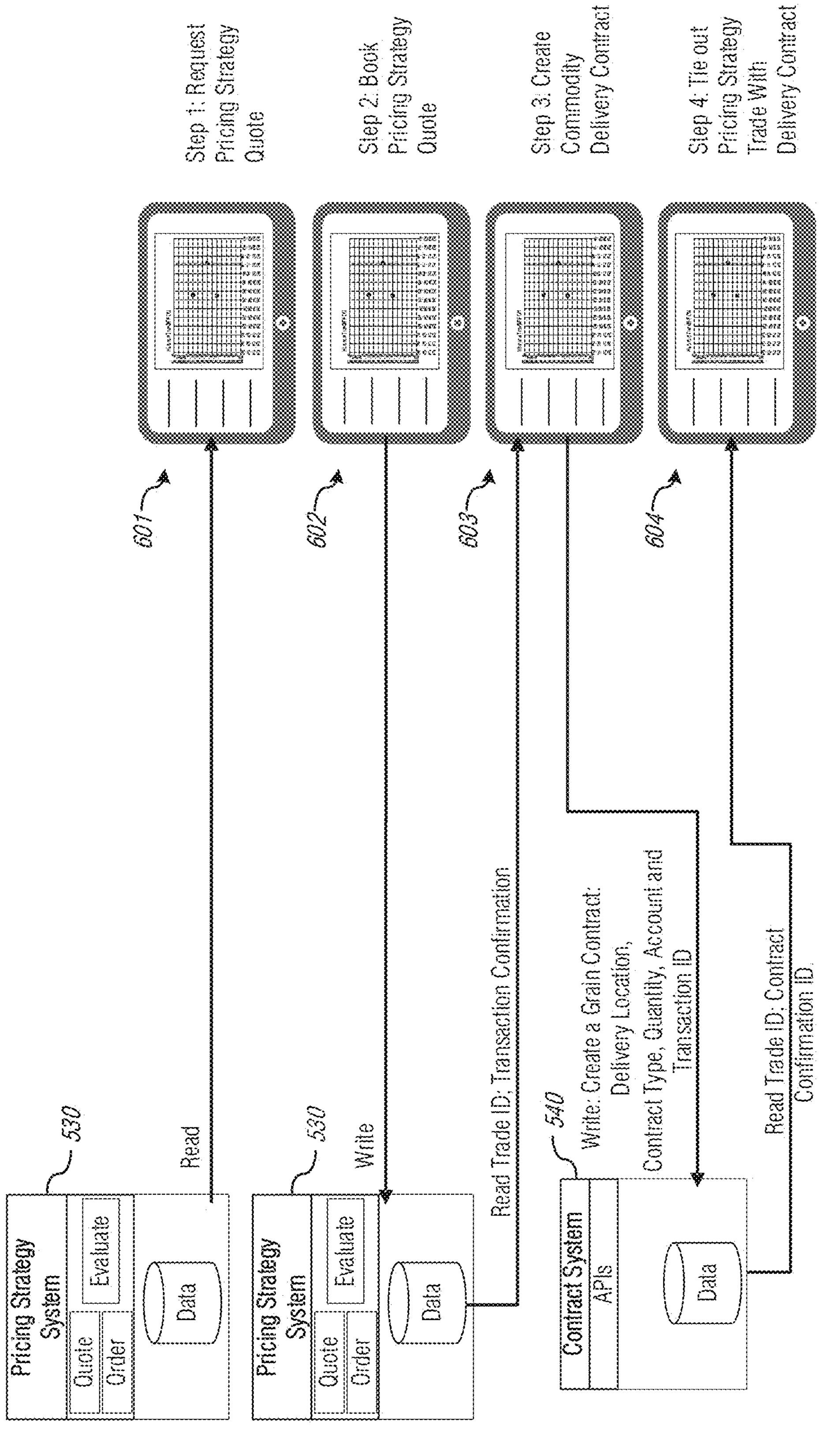
FIG. 6 illustrates a sequence of application programming interface transactions, used for establishing and updating commodity delivery contracts and commodity derivative strategies, according to an example.

FIG. 6 illustrates an example sequence of application programming interface transactions, used for establishing and updating commodity delivery contracts and commodity derivative strategies. This sequence illustrates how aspects of the systems introduced by FIG. 5 are invoked by transactions from a graphical user interface to accomplish specific pricing strategy and contracting operations.

At operation 601, graphical user interface functionality is invoked, by a user, to request a pricing strategy quote. This may include one or more read transactions from the pricing strategy system 530 in connection with quotes, orders, and price strategy specifications.

At operation 602, graphical user interface functionality is invoked, by a user, to book a pricing strategy quote. This may include one or more write transactions to the pricing strategy system 530 in connection with the quotes, orders, or price strategy specifications. The data established from booking the pricing strategy quote (e.g., trade ID, transaction confirmation) may be used in the next operation.

At operation 603, graphical user interface functionality is invoked, by a user, to create a commodity delivery contract. This may include access to the contract system 540 to write the delivery contract, by providing information such as contract type, quantity, account information, and transaction information (e.g., transaction identifiers).

At operation 604, graphical user interface functionality is invoked, by a user, to tie out (e.g., link) a pricing strategy trade with a delivery contract. This may include use of the contract system 540 to read trade information (e.g., a trade identifier) and contract information (e.g., a contract confirmation identifier).

FIGS. 7A to 7F illustrate an example progression of user interface functionality, within a user interface 700 (and its accompanying views 700A-700F), used for establishing an advanced pricing strategy for an existing commodity contract. It will be understood that a graphical user interface usable with the present approaches may include less, more, or different functionality, and that the user interface 700 (and the other user interface examples which are illustrated among FIGS. 8A to 10G) are provided only for purposes of example and illustration.

Figure 7A:
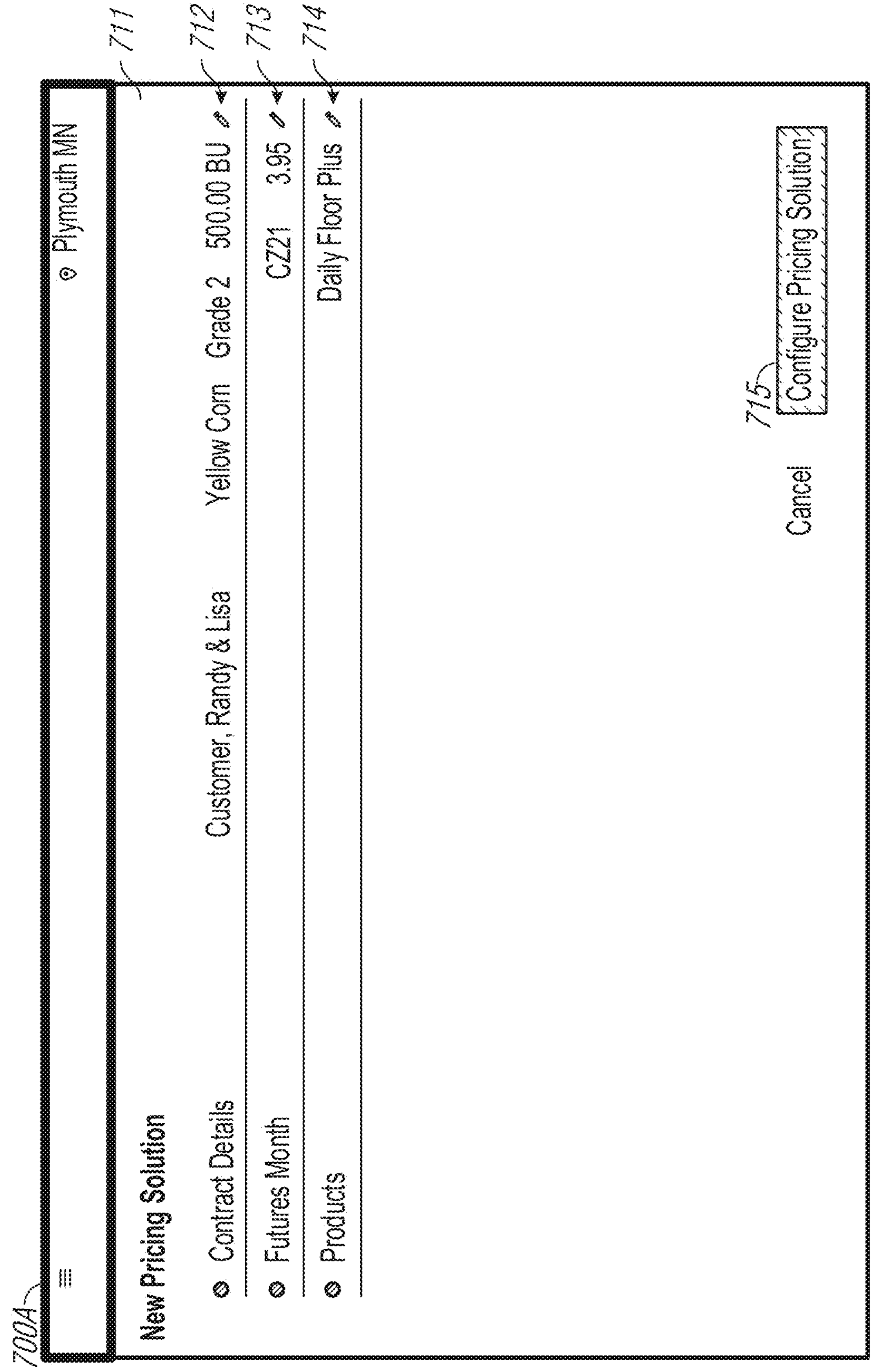
FIGS. 7A to 7F illustrate a progression of user interface functionality used for establishing an advanced pricing strategy for an existing commodity contract, according to an example.

FIG. 7A begins with an illustration of a user interface view 700A. Within this view, a new pricing solution is selected within a user interface screen 711. This user interface screen 711 includes functionality to select and indicate: contract details 712, such as contract information associated with an existing customer, including customer details, commodity type, commodity grade, and commodity quantity (e.g., number of bushels); contract futures detail 713, such as an indication of which commodity futures contract that the pricing solution is to be associated with; and contract product information 714, which provides an indication of the particular pricing solution type (e.g., "Daily Floor Plus" referring to a specific type of pricing solution provided for a delivery contract). This user interface screen 711 further includes a selection option 715 (e.g., button or other user interface control) to proceed with configuration of the pricing solution.

Figure 7B:
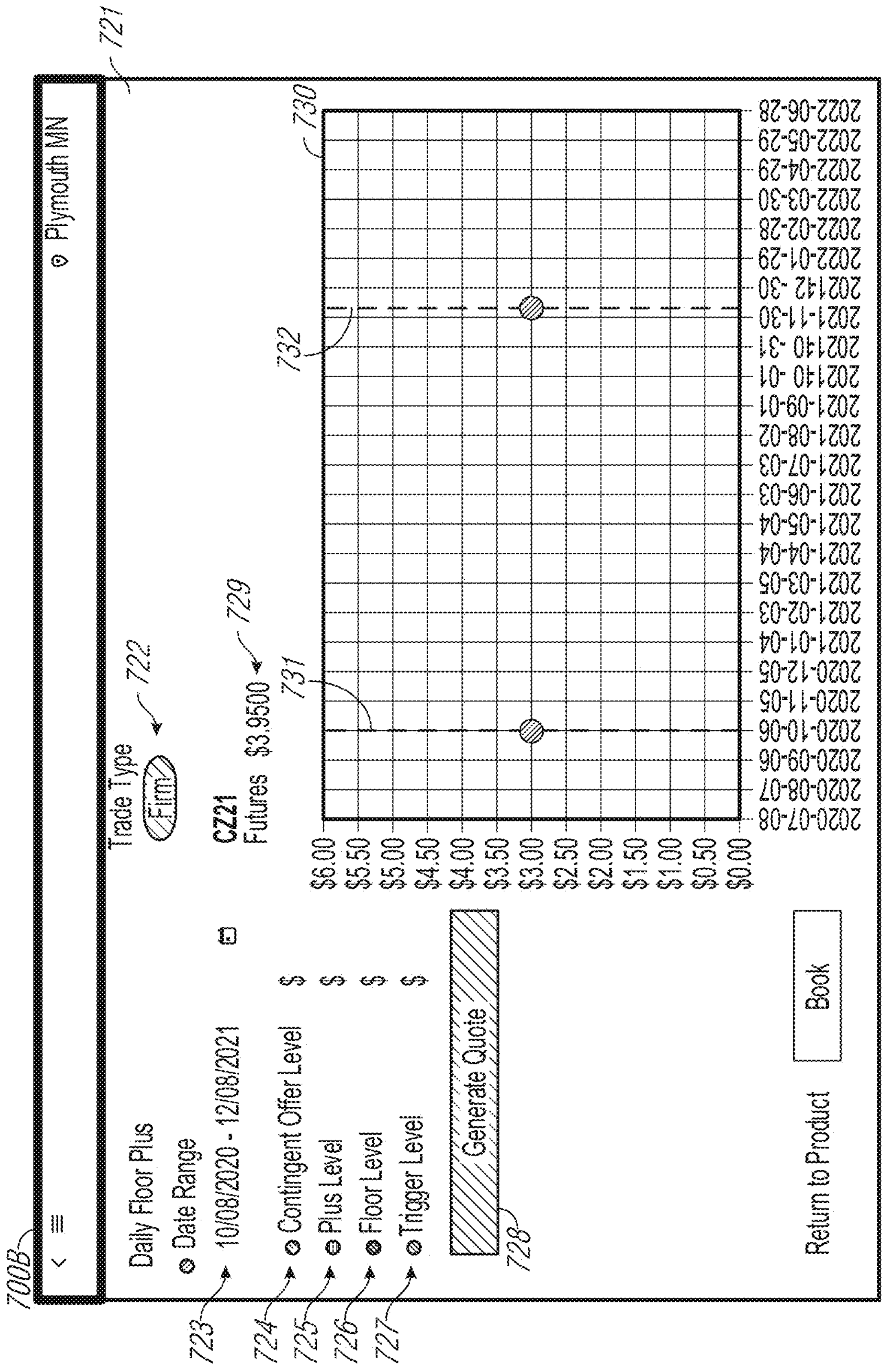

FIG. 7B continues with an illustration of a user interface view 700B. Within this view, a configuration screen for the pricing solution is provided within a user interface screen 721. This screen 721 includes, among other information: trade information 722 (e.g., an indication that a firm trade type is invoked by the product information); time information 723 (e.g., a date range for the pricing solution, here "Daily Floor Plus"); pricing information values 724, 725, 726, 727 (e.g., which correspond to the various pricing levels of the specific pricing solution); and a quote selection option 728 (e.g., button or other user interface control) to generate a price quote based on the supplied price values and time values. The screen 721 also includes futures product information 729 (e.g., to indicate a current futures price, such as obtained from a market information source). The price quote that is generated will be based on the futures product information 729 as well as the time information 723 and pricing information values 724-727.

The screen 721 also includes an interactive graph representation 730, which can be manipulated and changed by a user. In the shown example, the interactive graph representation has a vertical axis and a horizontal axis, with the vertical axis corresponding to time values and the horizontal axis corresponds to price values. Within the graph representation 730, two vertical user interface controls provided by lines 731, 732 (lines perpendicular to the vertical axis) are used to select a time range (e.g., a date range for the pricing strategy quote).

Figure 7C:
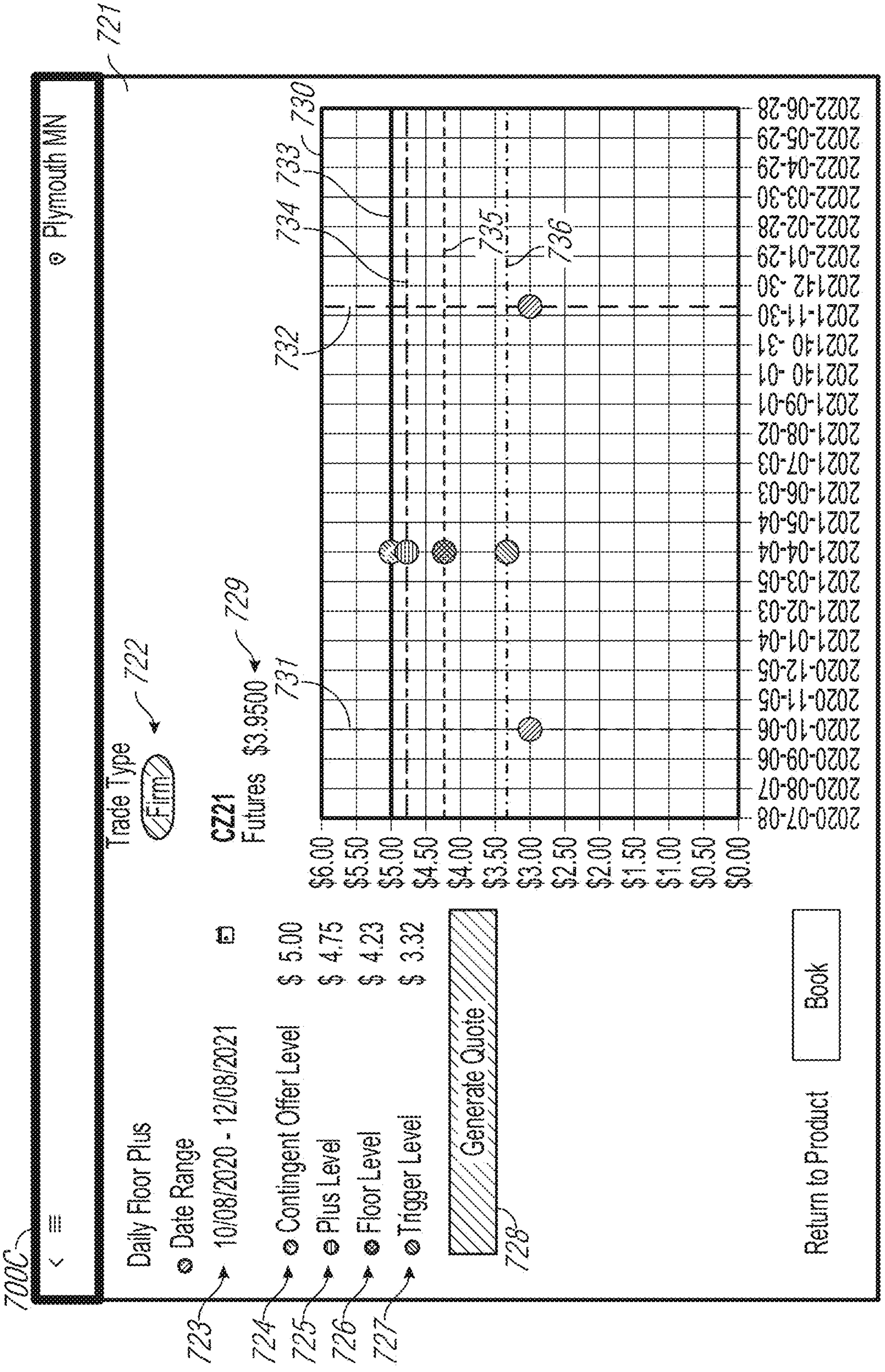

FIG. 7C continues with an illustration of a user interface view 700C, for further configuring of the pricing solution first established in view 700B. Within this view, the pricing information values 724, 725, 726, 727 have been established to different price values. Each of these price values are also displayed with corresponding vertical interface user controls provided by lines 733, 734, 735, 736. The interactive graph representation 730 allows movement of the vertical and horizontal user interface controls among respective positions correspond to different time and price values, respectively (e.g., such as by user interaction which drags the line to another location on the graph). Other methods may also allow manual entry such as with a text box to enter new prices for values 724-727, or a calendar associated with the time information 723.

Figure 7D:
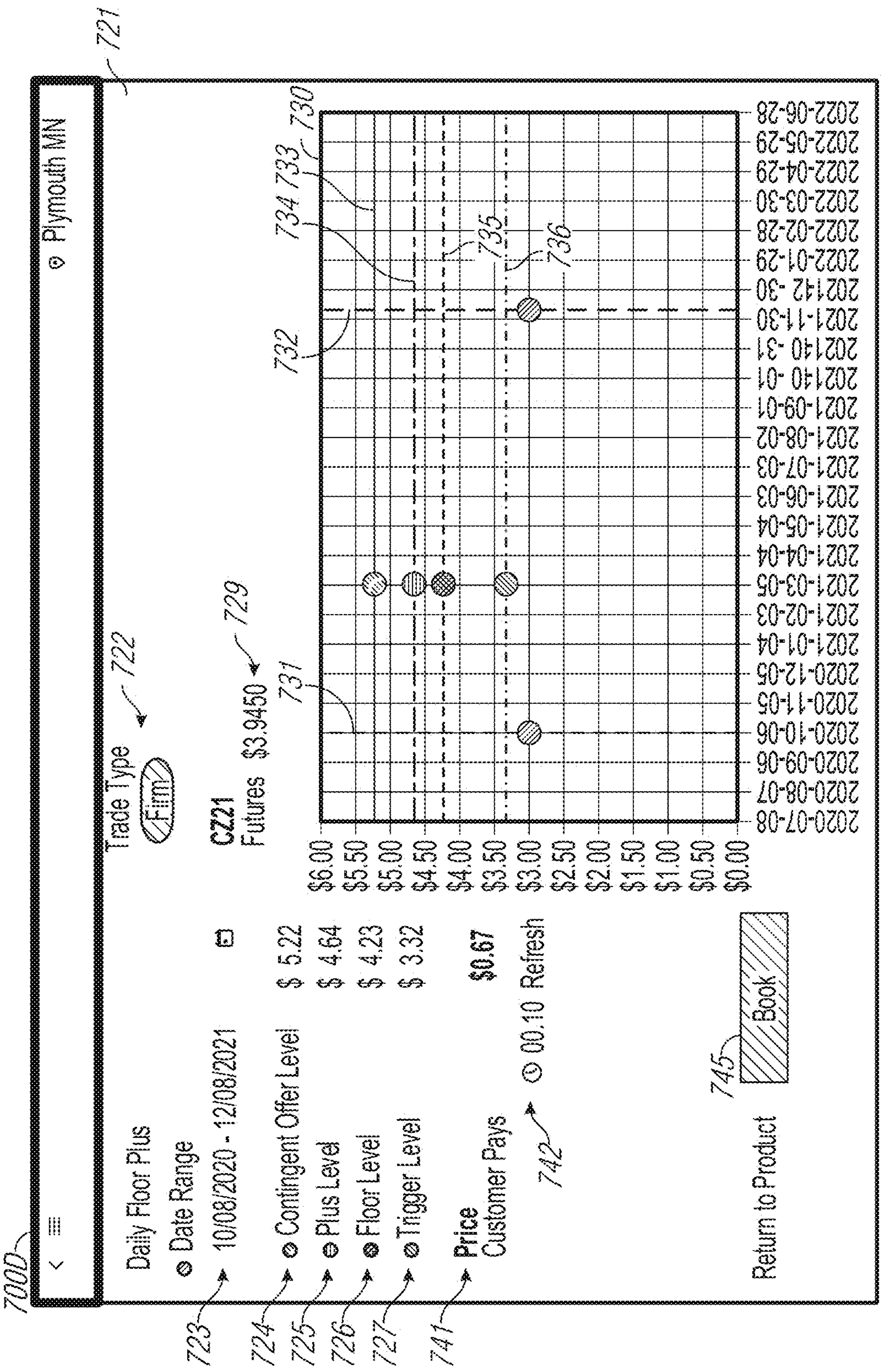

FIG. 7D continues with an illustration of a user interface view 700D, which represents the result of generating a quote of the pricing strategy at the time value and the price value (e.g., corresponding to respective positions of the vertical user interface control lines and the horizontal user interface control lines). Specifically, the information display section displays a price value 741 for the customer to invoke the pricing strategy (e.g., specifying that the pricing strategy will cost $0.67 per bushel or other unit of measurement) and an expiration value 742 (e.g., specifying that the quote must be accepted and activated within 10 seconds before it expires). A user interface control, in the form of button 745, is provided to allow the customer to cause activation of the pricing strategy.

Figure 7E:
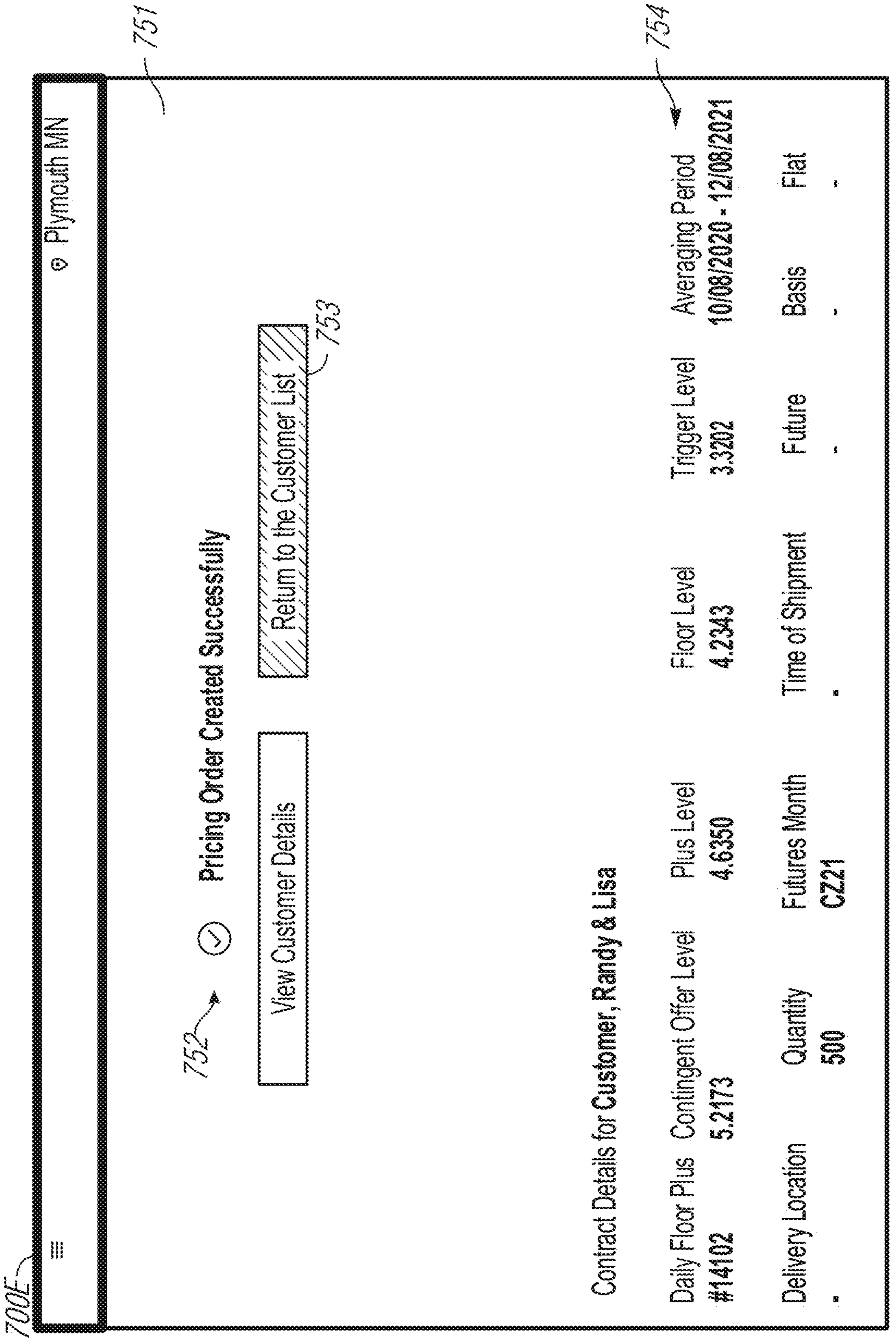

FIG. 7E continues with an illustration of a user interface view 700E, which indicates the result of activation of the pricing strategy. Here, a user interface screen 751 provides a status message 752 (e.g., that the pricing order was created successfully) and other selectable user interface controls such as button 753 to perform other actions (e.g., return to a customer information screen). Various information 754 associated with the activation of the pricing strategy and any underlying contract may also be displayed in the screen 751.

Figure 7F:
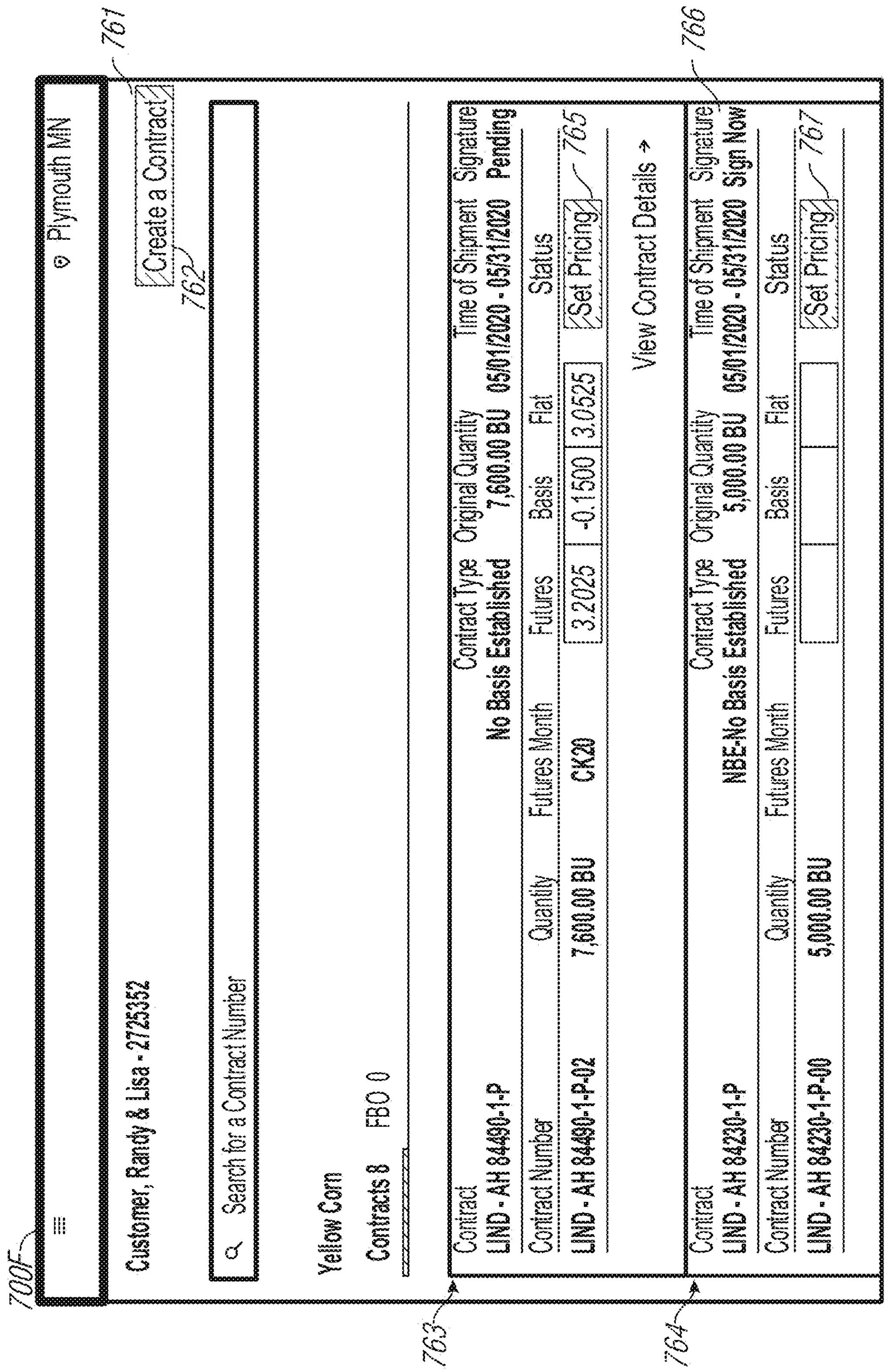

FIG. 7F continues with an illustration of another user interface view 700F, which provides a user interface screen 761 with additional views of customer information associated with one or more pricing strategies. For example, a view of customer information may indicate various contract information details, such as a first set of contract information 763 associated with a first commodity delivery contract, and a second set of contract information 764 associated with a second commodity delivery contract. This user interface screen 761 may include functionality such as user interface controls 762, 765, 766, 767 (e.g., button, menu, or link) to create a new contract for the customer, to set pricing for the established contracts, or to provide a signature or other required information for the contracts.

FIGS. 8A to 8G illustrate a progression of user interface functionality used for establishing an advanced pricing strategy for a new commodity contract. Here, FIG. 8A begins with an illustration of a user interface view 800A, which provides functionality with user interface screen 811 similar to that described for user interface screen 711, including contract details 812, contract futures detail 813, and contract product information 814. In view 800A, however, a specific set of user interface controls 815 (buttons or selectable boxes) are provided to select different pricing strategies, specifically, to select a "Min Price" minimum guaranteed pricing strategy product.

Figure 8A:
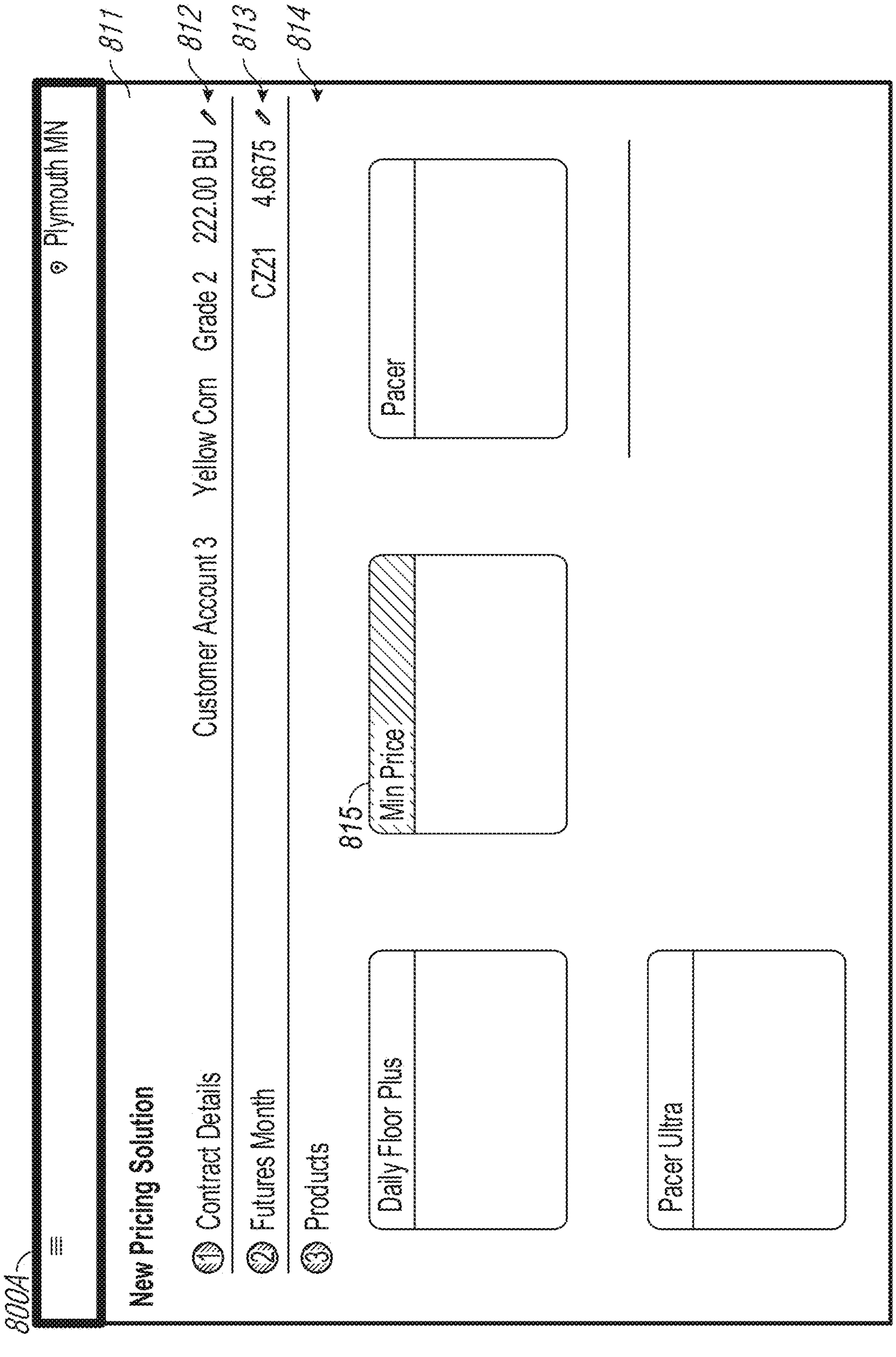
FIGS. 8A to 8G illustrate a progression of user interface functionality used for establishing an advanced pricing strategy for a new commodity contract, according to an example.
Figure 8B:
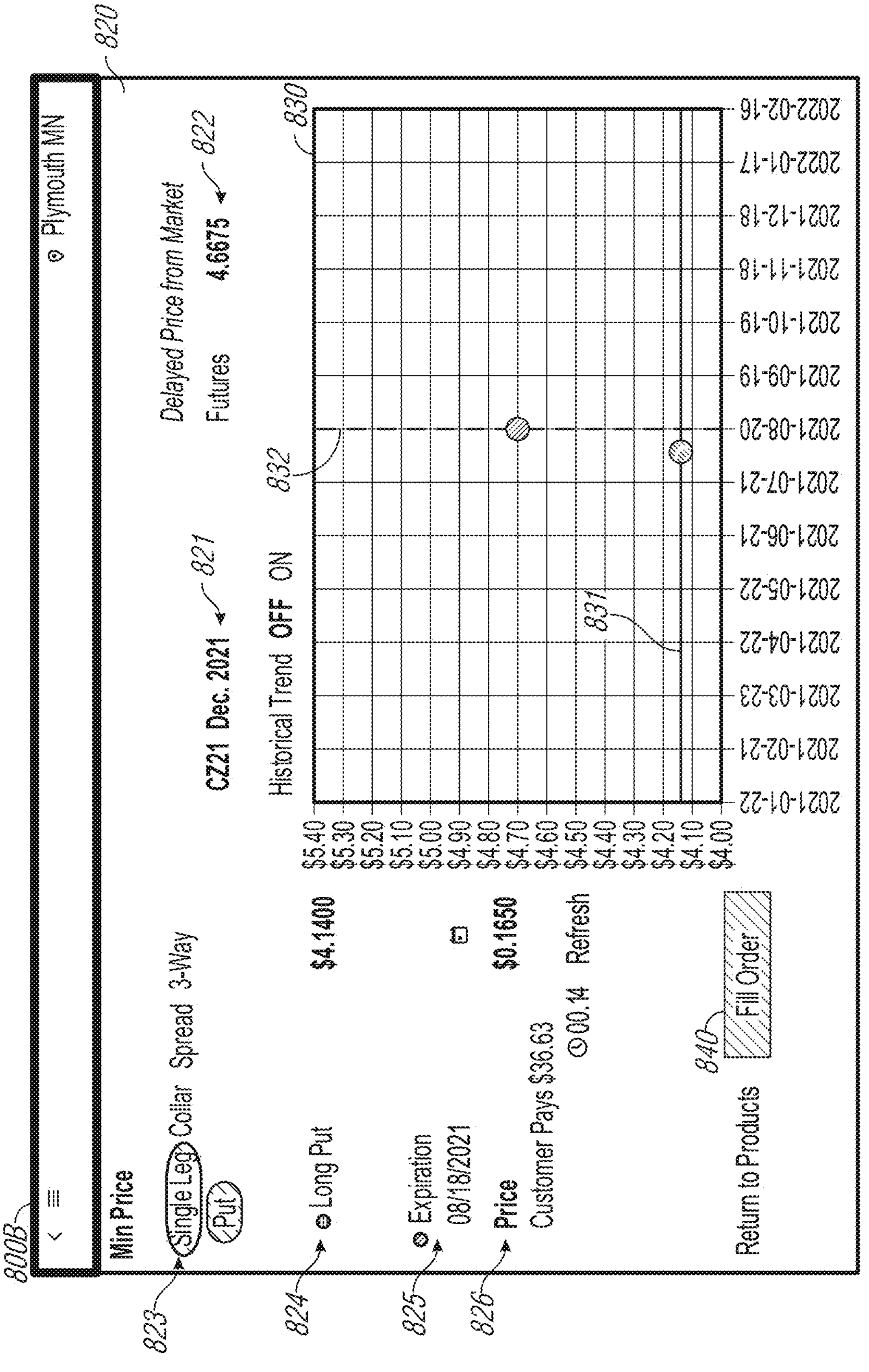

FIG. 8B continues with an illustration of a user interface view 800B. Here, a new pricing solution for a new commodity contract (to be established) can be specified with user interface screen 820, based on quoting and selection of a particular futures options contract (an option contract on futures). User interface screen 820 includes an information display portion, providing futures contract information 821, futures price information 822, option product information 823, option product details 824, option expiration information 825, and option price 826. The user interface screen 820 also includes an interactive graph representation 830, providing similar functionality as the interactive graph representation 730. Thus, a vertical user interface control provided by line 832 can be moved to select different time values (option contract expiration dates) associated with the options contract; and a horizontal user interface control provided by line 831 can be used to specify a different price for the option product details. A user interface control 840 (e.g., button or link) can be used to fill the order for the options contract.

Figure 8C:
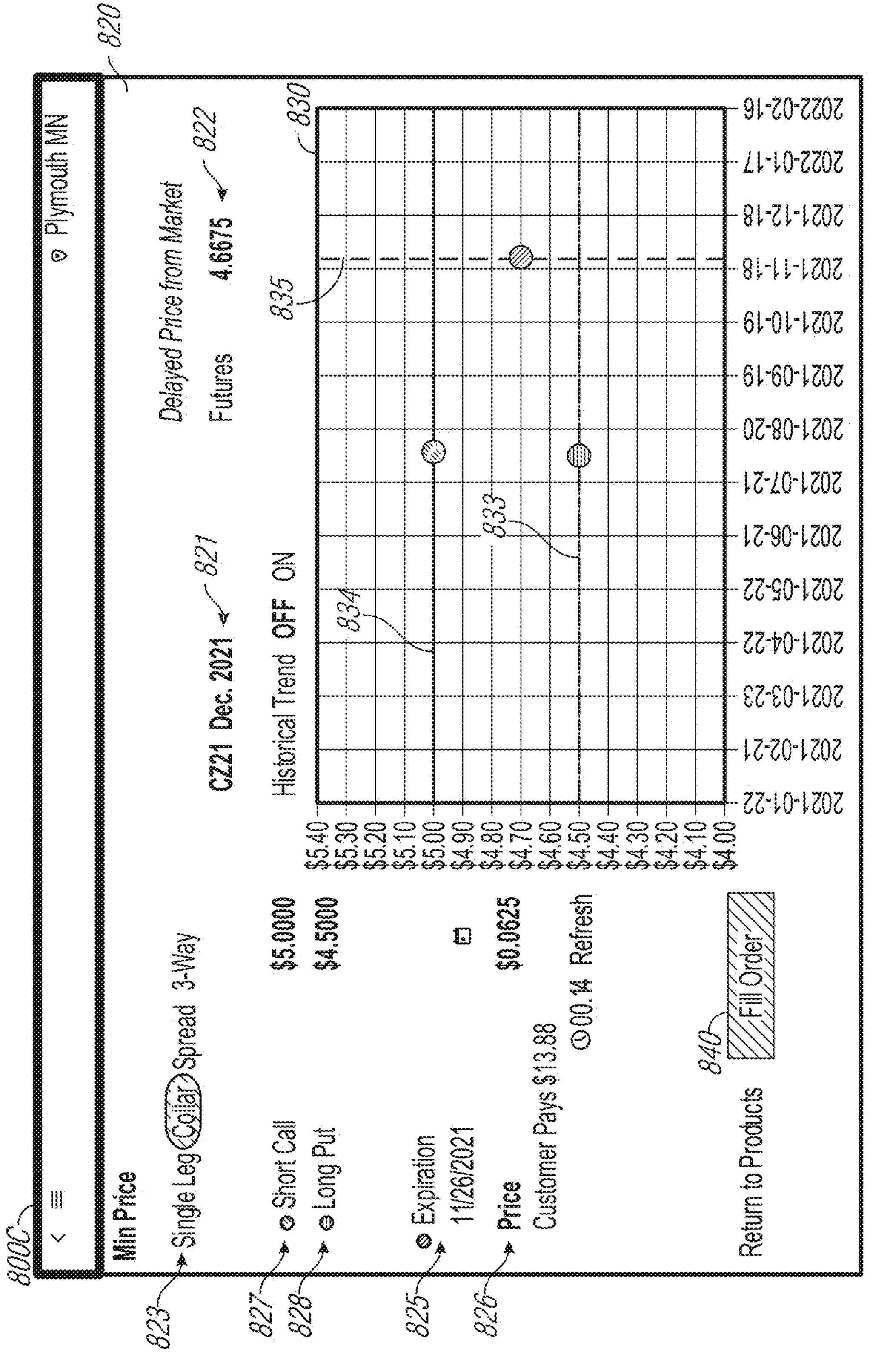

FIG. 8C continues with an illustration of a similar user interface view 800C, specifying a different pricing strategy based on another futures options contract type (a collar). Here, the user interface screen 820 includes a first option price 827 (for a short call position) and a second option price 828 (for a long put position). These multiple prices are specified with horizontal user interface controls provided by lines 833 and 834; the relevant time value (option contract expiration date) associated with the options contract is specified with a vertical user interface control provided by line 835.

Figure 8D:
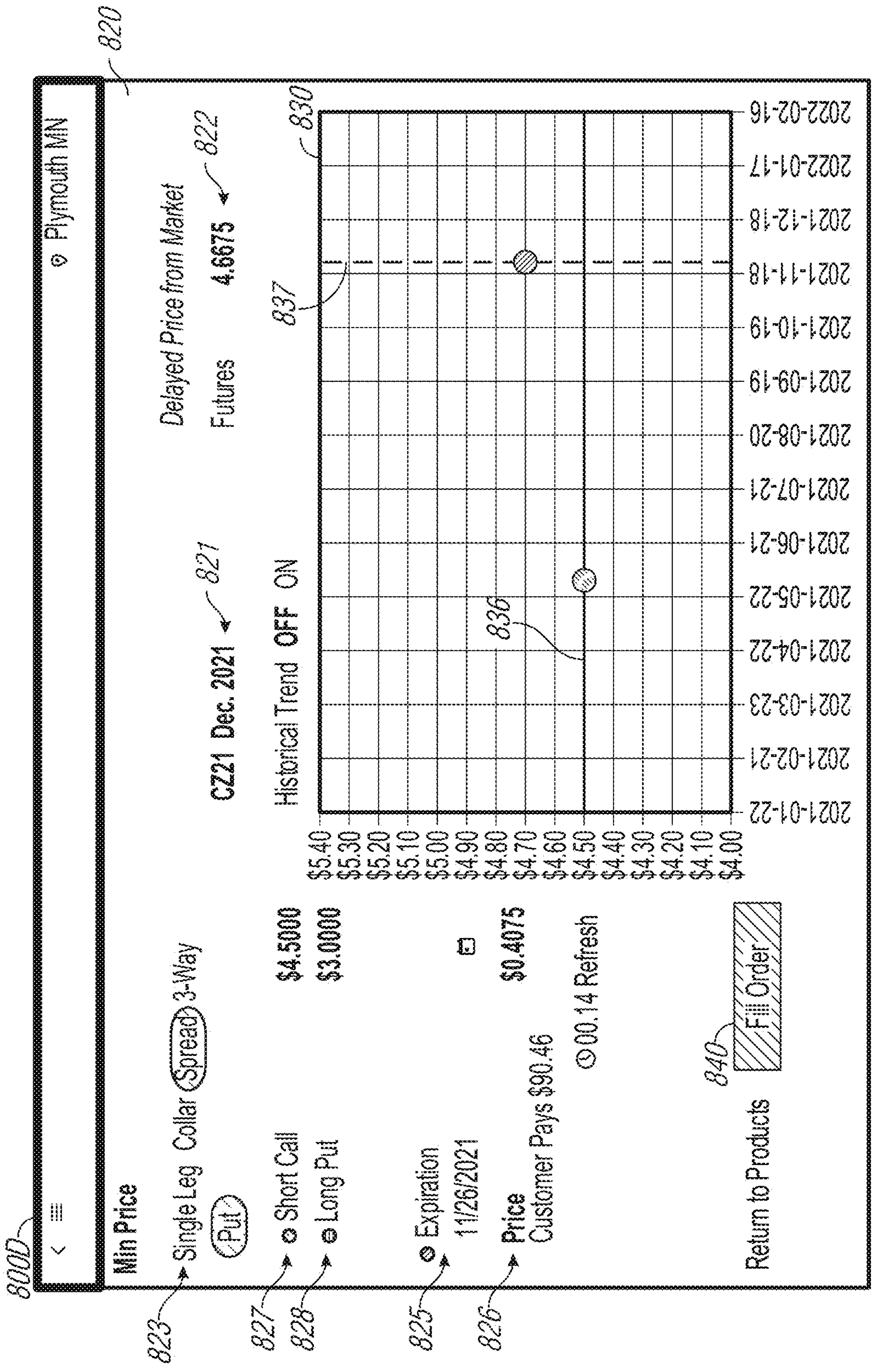

FIG. 8D continues with an illustration of a similar user interface view 800D, specifying a different pricing strategy based on another futures options contract type (a spread). Here, the user interface screen 820 includes a first option price 827 (for a short call position) and a second option price 828 (for a long put position). The price for the first option position is specified with a horizontal user interface control provided by lines 836 (with the second price not being visualized, due to its low value); the relevant time value (option contract expiration date) associated with the options contract is specified with a vertical user interface control provided by line 837.

Figure 8E:
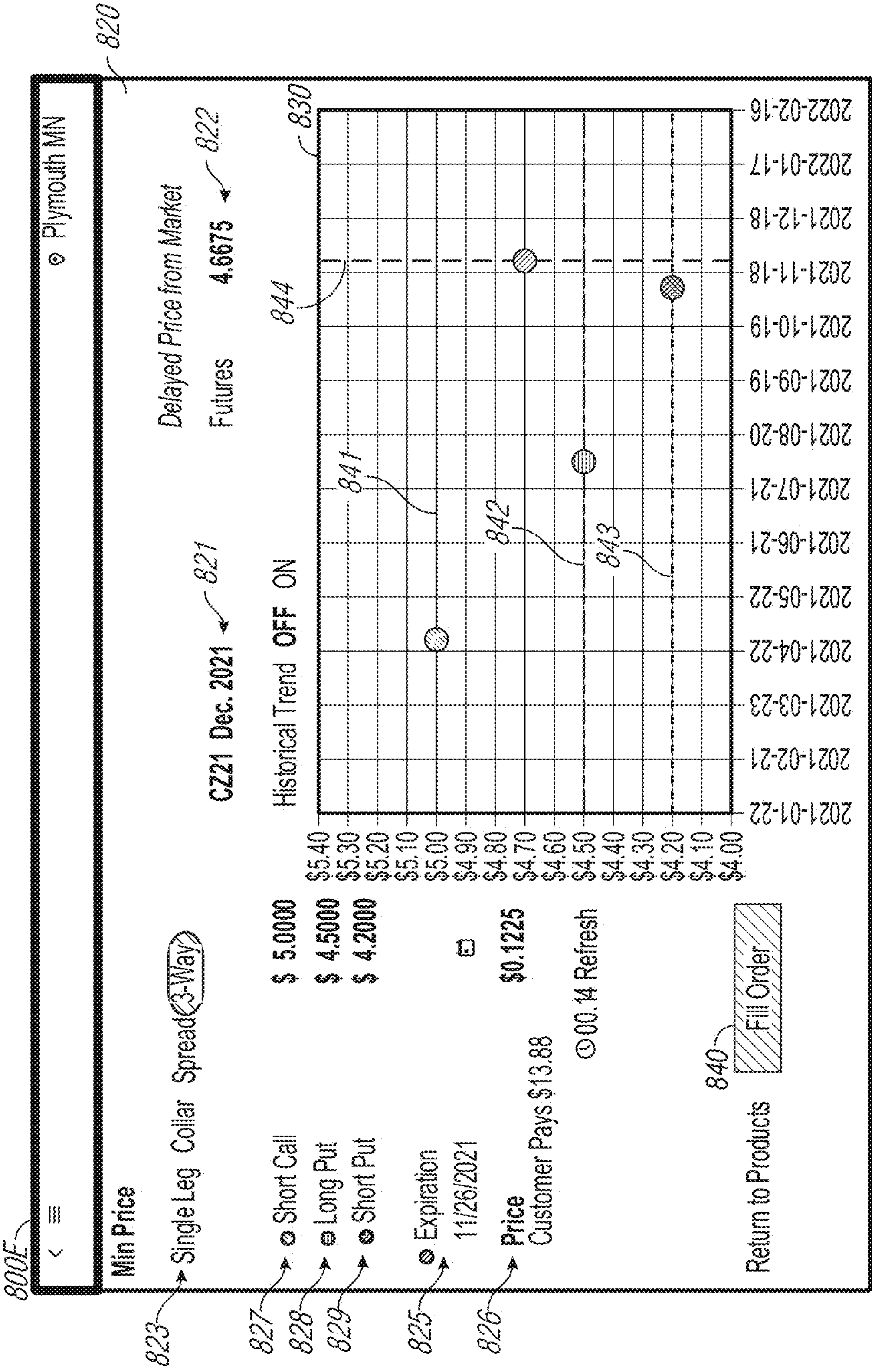

FIG. 8E continues with an illustration of a similar user interface view 800E, specifying a different pricing strategy based on another futures options contract type (a three-way options strategy). Here, the user interface screen 820 includes a first option price 827 (for a short call position), a second option price 828 (for a long put position), and a third option price 829 (for a short put position). These multiple prices are specified with horizontal user interface controls provided by lines 841, 842, 843; the relevant time value (option contract expiration date) associated with the options contract is specified with a vertical user interface control provided by line 844.

Figure 8F:
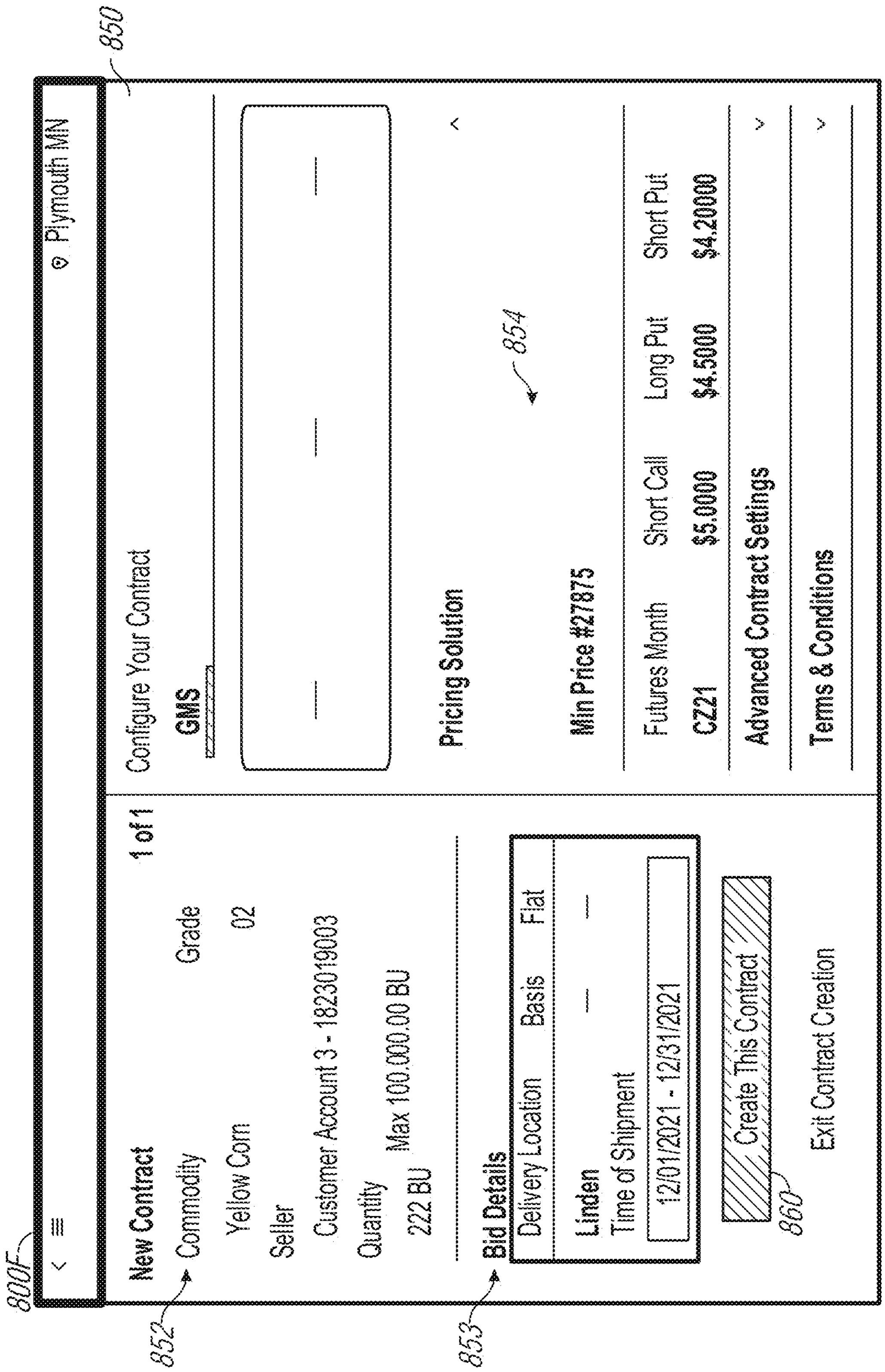
Figure 8G:
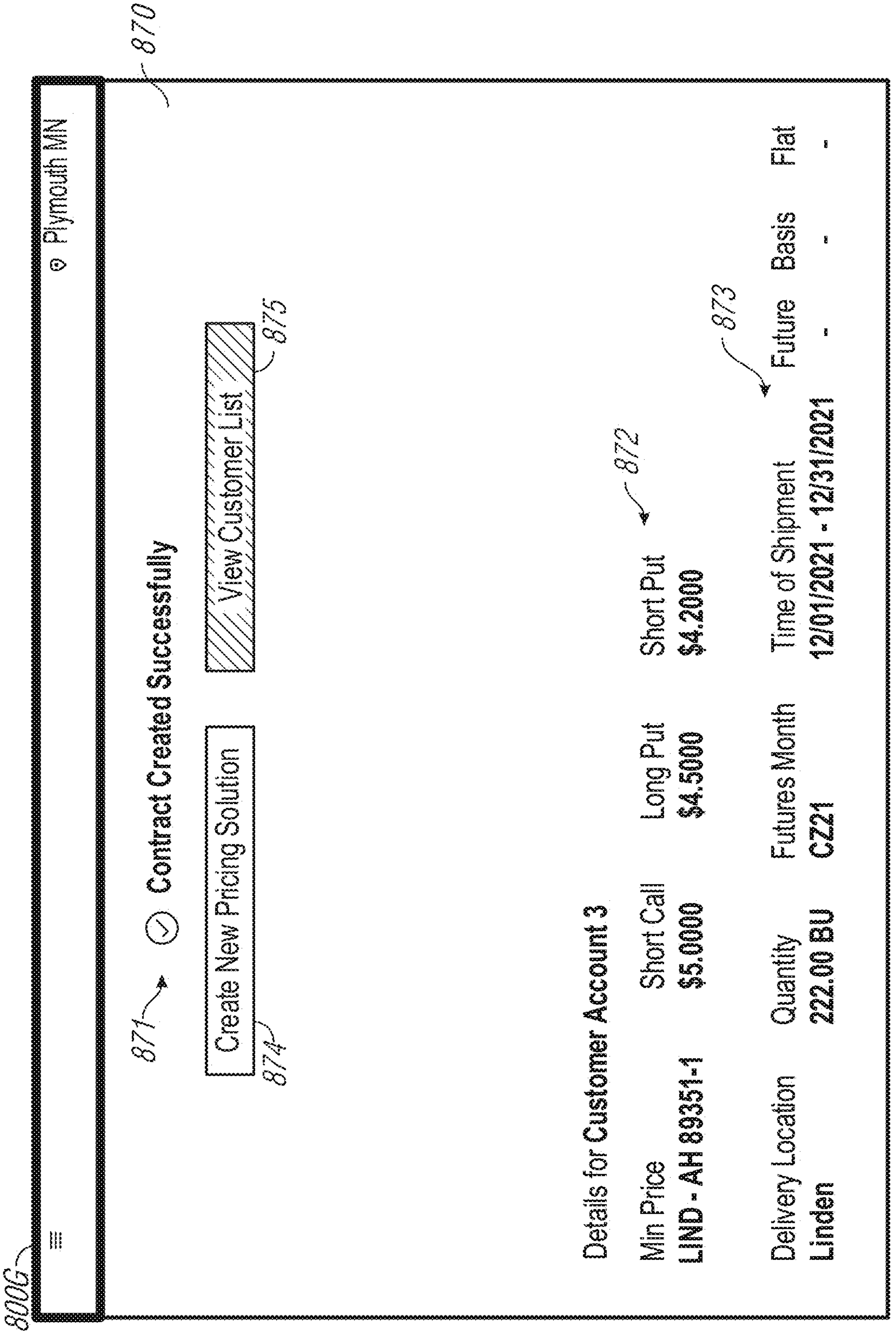

FIGS. 8F and 8G conclude with user interface views 800F, 800G with user interface screens 850, 870 respectively. Upon selection of the options contract details, and filling an order for the options contract details, user interface functionality is provided to create a commodity delivery contract. This may include the use of screen 850 to create a new delivery contract, including user interface fields and outputs which provide contract details 852, bid details 853, and pricing solution details 854 (e.g., the pricing solution selected and activated with the user interface screen 820). A user interface control 860 (e.g., button) provides user-selectable option to create or activate the commodity delivery contract. In screen 870, the result of activation of the pricing strategy and contract is provided, such as with a status message 871, selectable user interface controls such as buttons 874, 875 to perform contract or pricing strategy actions, and displays of pricing strategy information 872 and contract information 873.

FIGS. 9A to 9E illustrate another example progression of user interface functionality used for establishing advanced pricing strategies for multiple new commodity contracts. Here, FIG. 9A begins with an illustration of a user interface view 900A, which provides functionality with user interface screen 911 similar to that described for user interface screens 711 and 811, including contract details 912, contract futures detail 913, contract product information 914, and user interface controls 915. In view 900A, however, multiple new contracts for different customers have been selected for association with a pricing strategy. This pricing strategy, "Pacer", relates to a price averaging period defined from a range of dates.

Figure 9A:
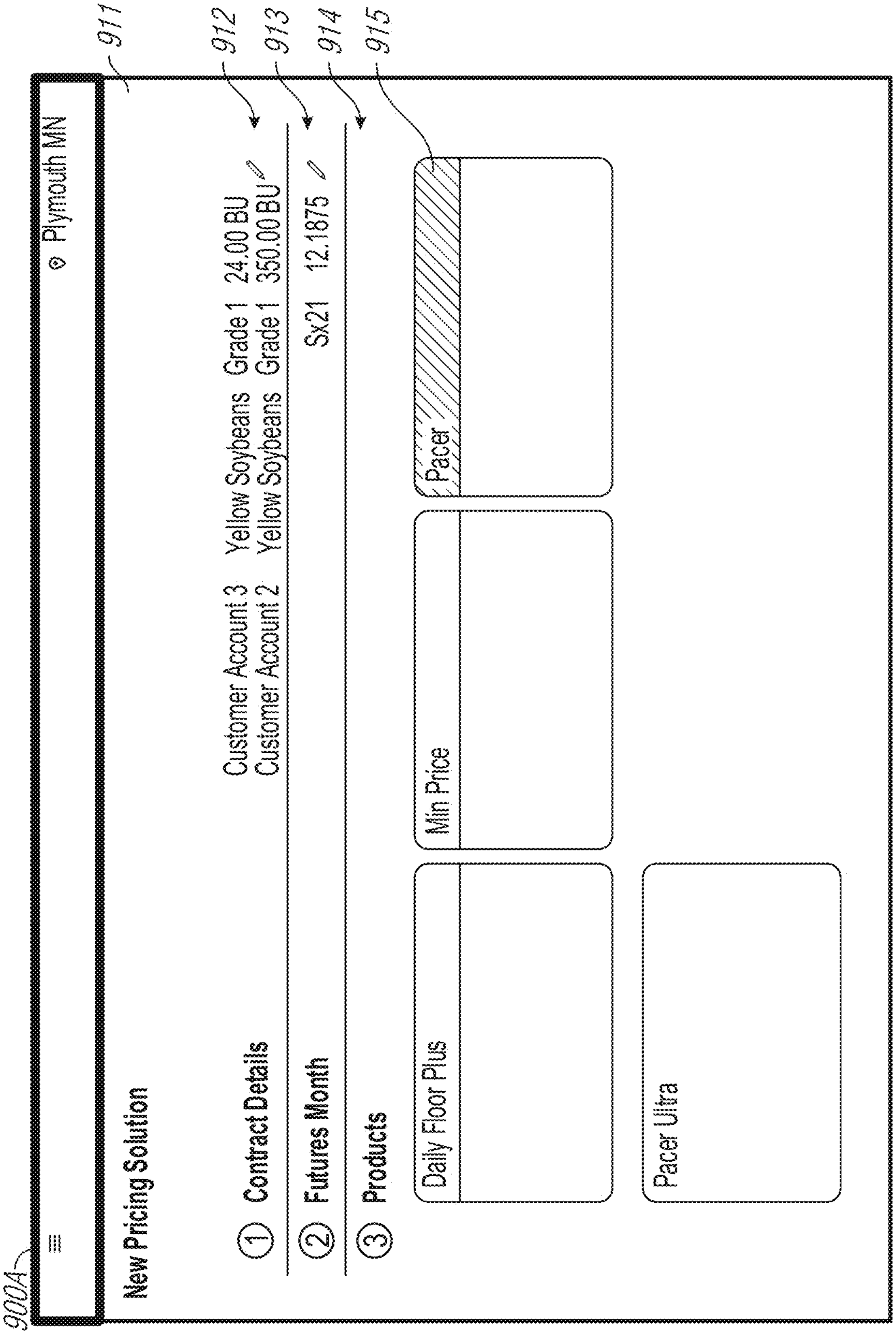
FIGS. 9A to 9E illustrate a progression of user interface functionality used for establishing advanced pricing strategies for multiple new commodity contracts, according to an example.
Figure 9B:
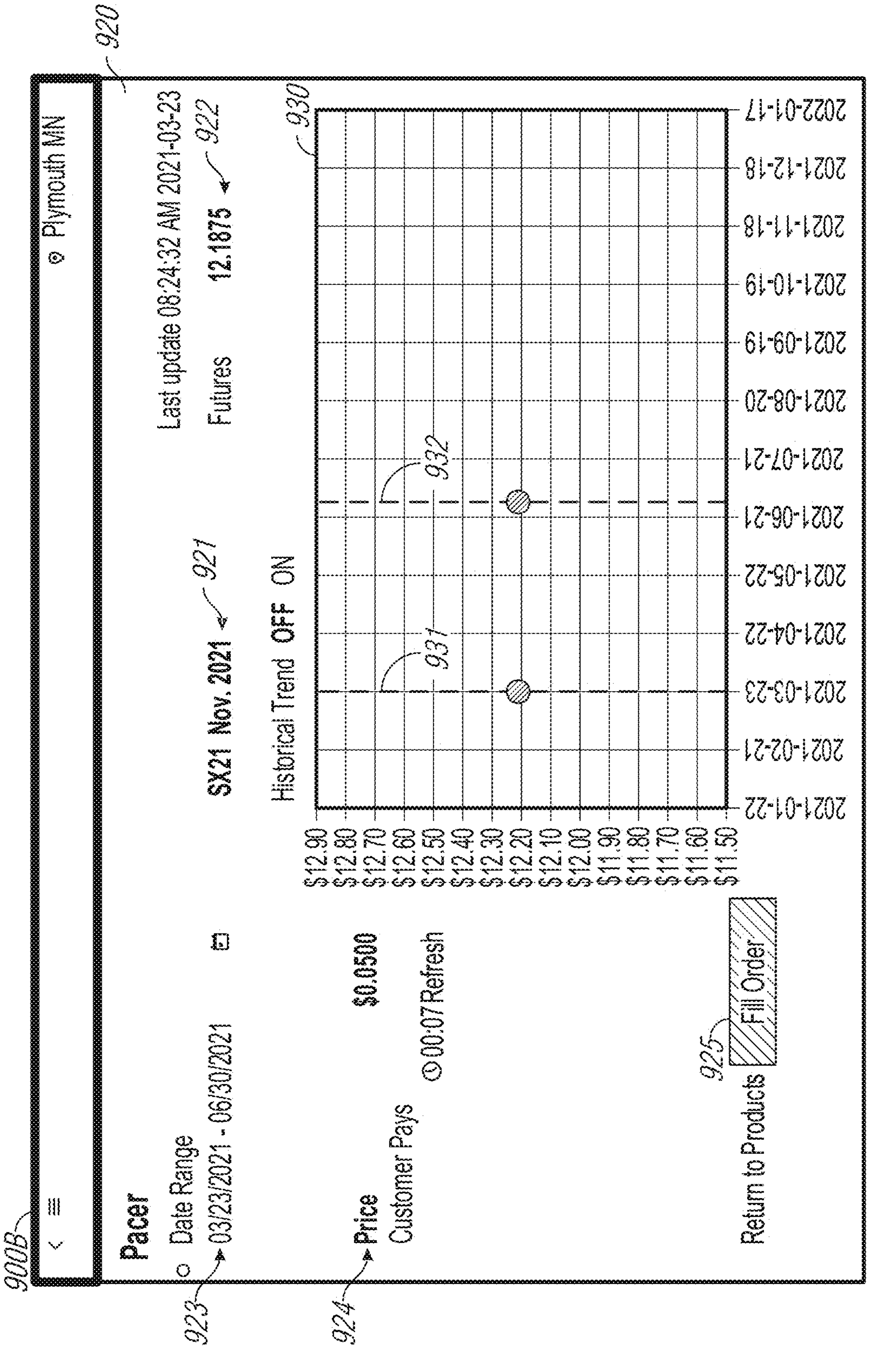

FIG. 9B continues with an illustration of a user interface view 900B. Here, a new pricing solution for a new commodity contract (or multiple contracts) to be created can be specified with user interface screen 920, based on quoting and selection of a particular pricing strategy to be tied to multiple futures contracts. User interface screen 920 includes an information display portion, providing futures contract information 921, futures price information 922, pricing strategy date information 923, and pricing strategy price 924. The user interface screen 920 also includes an interactive graph representation 930, providing similar functionality as the interactive graph representations 730, 830. Thus, a vertical user interface control provided by lines 931, 932 can be moved to select different time values (futures contract dates) which define a date range for the pricing strategy (e.g., to dynamically update pricing strategy date information 923). A user interface control 925 (e.g., button or link) can be used to fill the order for the pricing strategy.

Figure 9C:
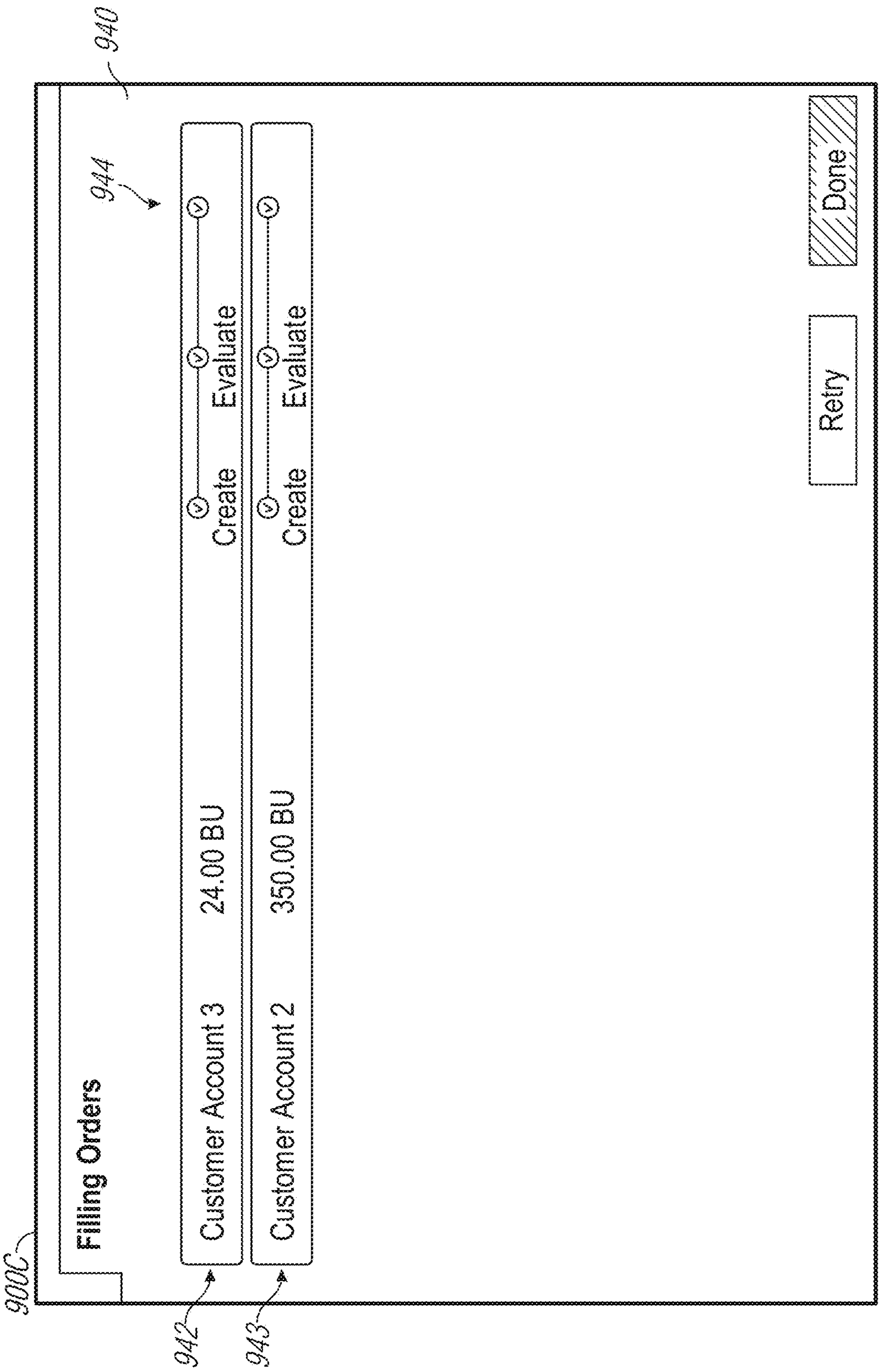

FIG. 9C includes an illustration of a user interface view 900C, providing a user interface screen 940 indicating a status 944 of filling multiple orders of a pricing strategy for multiple prospective contracts. Here, listings 942, 943 of the selected pricing strategies and applicable customer accounts include status information (e.g., whether the pricing strategy is created and confirmed via market execution).

Figure 9D:
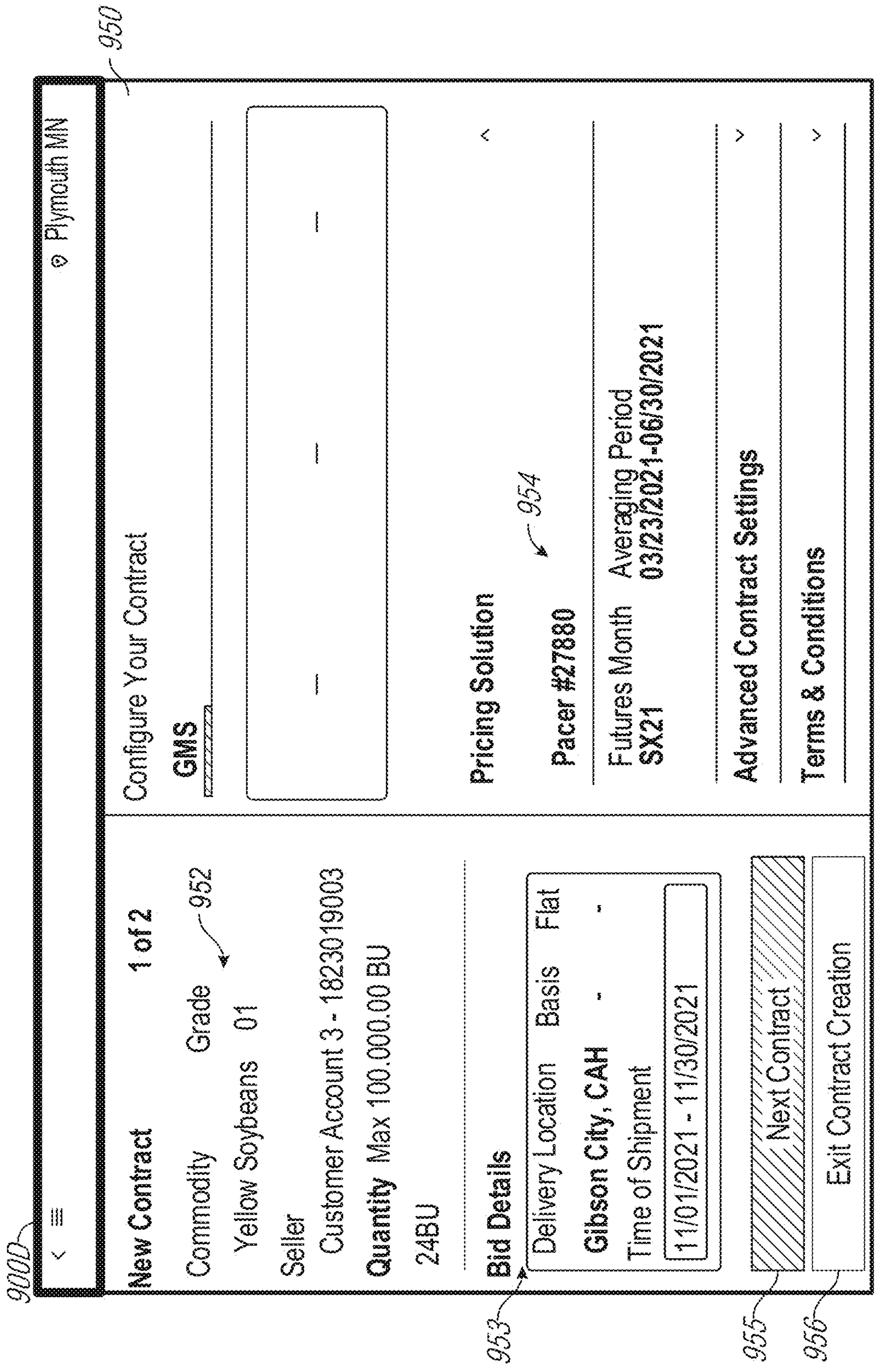

FIG. 9D includes an illustration of a user interface view 900D, providing a user interface screen 950 for establishing contact details associated with the now-created pricing strategies (e.g., created as shown with the status information in FIG. 9C). Here, contract information 952, delivery information 953, and pricing solution information 954 may be specified or defined within the user interface screen 950. The screen 950 also includes user interface controls 955, 956 (e.g., buttons) to allow editing or cancellation of a contract details.

Figure 9E:
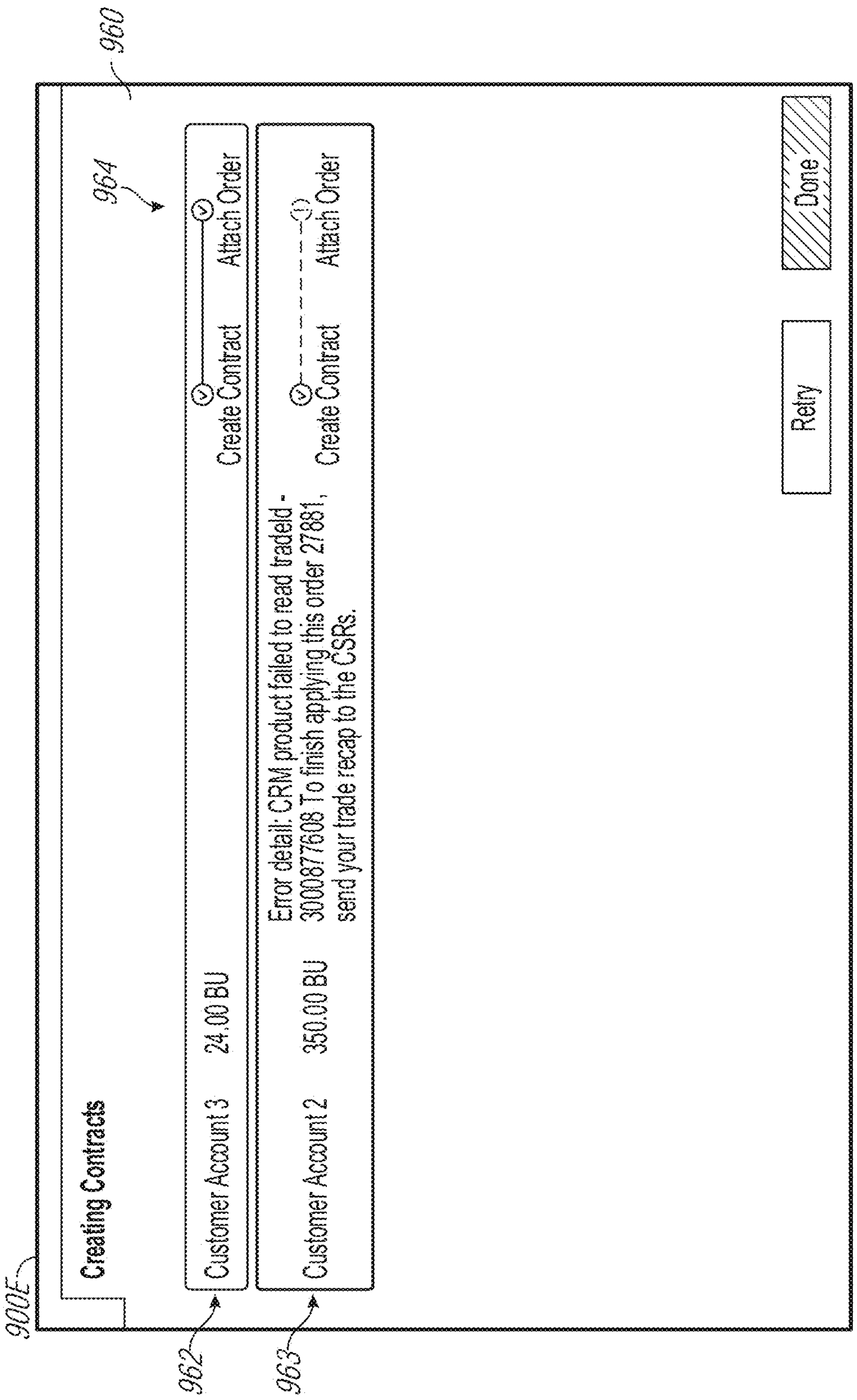

FIG. 9E includes an illustration of a user interface view 900E, providing a user interface screen 960 indicating a status 964 of creating contracts associated with the now-created pricing strategies (e.g., created as shown with the status information in FIG. 9C. In a similar manner as shown in FIG. 9C, the user interface screen 960 provides listings 962, 963 of the customer contracts, and whether the contracts were successfully created and attached to an order for the pricing strategy. An error message is displayed, in listing 963, indicating that an administrative user needs to intervene to correct some technical issue.

FIGS. 10A to 10G illustrate another example progression of user interface functionality used for establishing advanced pricing strategies for multiple existing commodity contracts. Here, FIG. 10A begins with an illustration of a user interface view 1000A, which provides a user interface 1001 with a listing of contract deliveries for multiple commodity delivery contracts 1002, 1003. Within this view, options are provided to add a pricing solution (via user interface control 1004), to sign a contract (via user interface control 1005), and to view pricing options (via user interface control 1006).

Figure 10A:
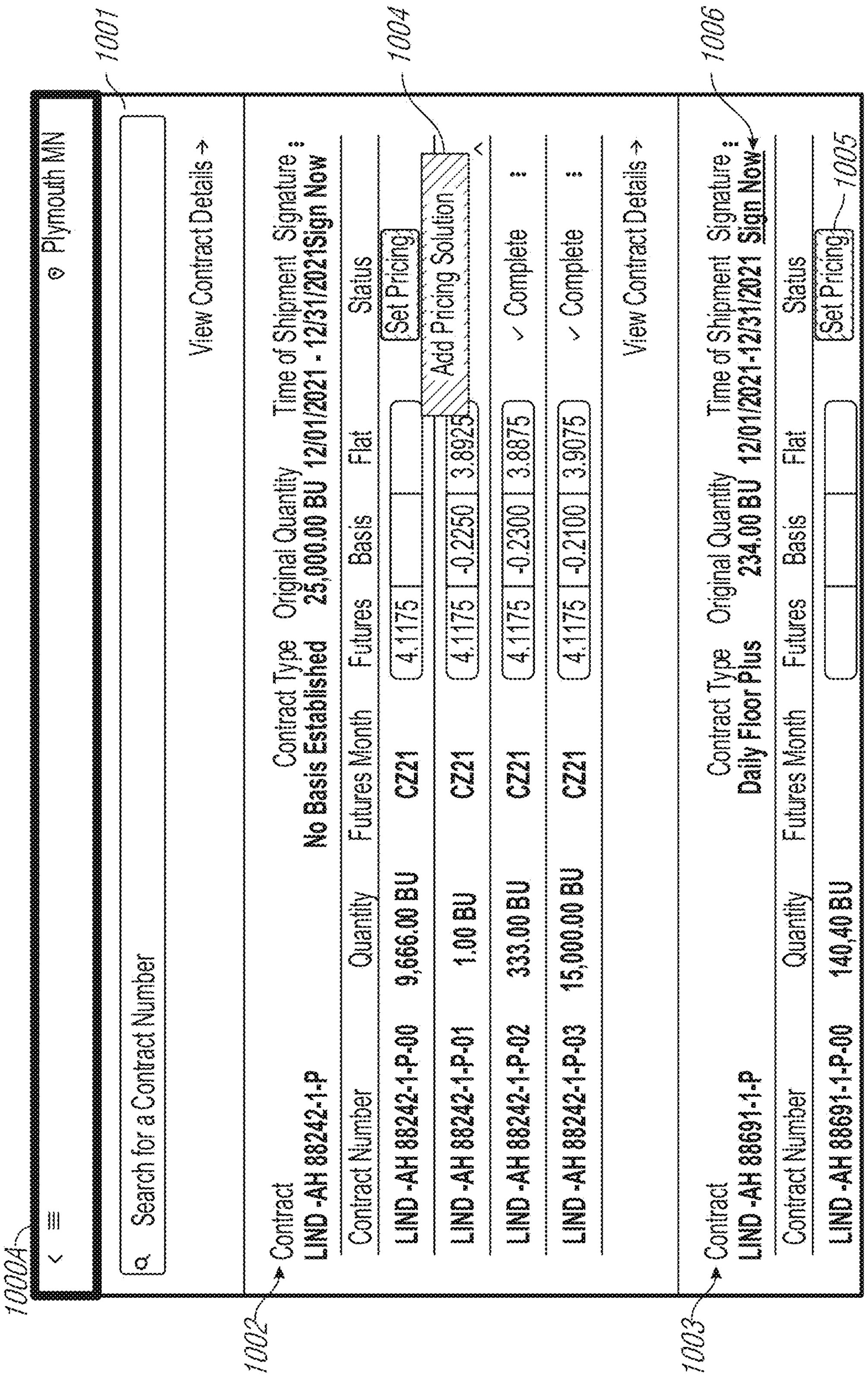
FIGS. 10A to 10G illustrate a progression of user interface functionality used for establishing advanced pricing strategies for multiple existing commodity contracts, according to an example.
Figure 10B:
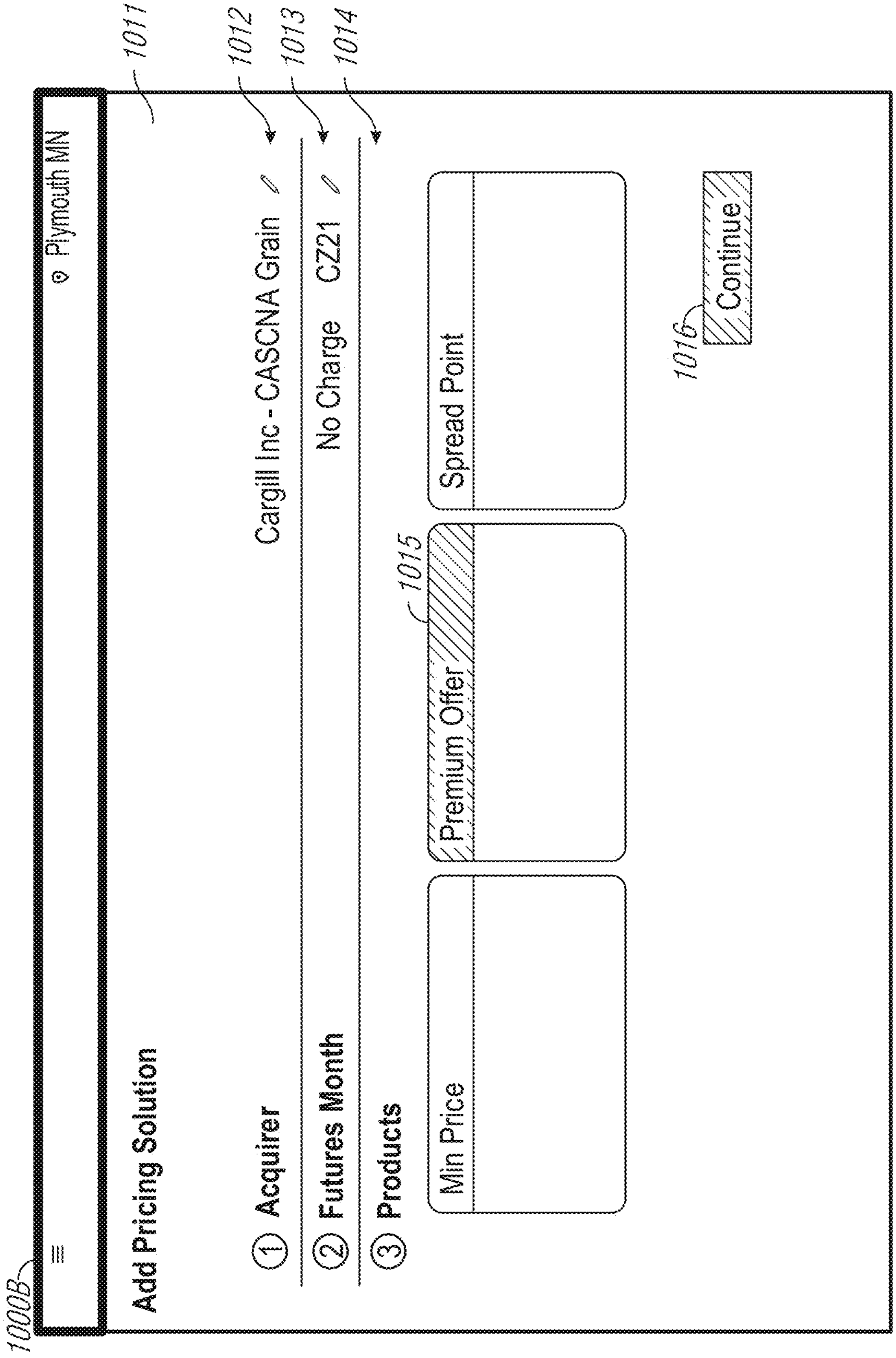

FIG. 10B includes an illustration of a user interface view 1000B, which provides functionality with user interface screen 1011 similar to that described for user interface screens 711, 811, and 911, including contract futures detail 1013, contract product information 1014, and user interface controls 1015, 1016. In view 1000B, however, because contract delivery details have been already specified, acquisition information 1012 relevant to the delivery of the commodity under the contract terms is provided.

Figure 10C:
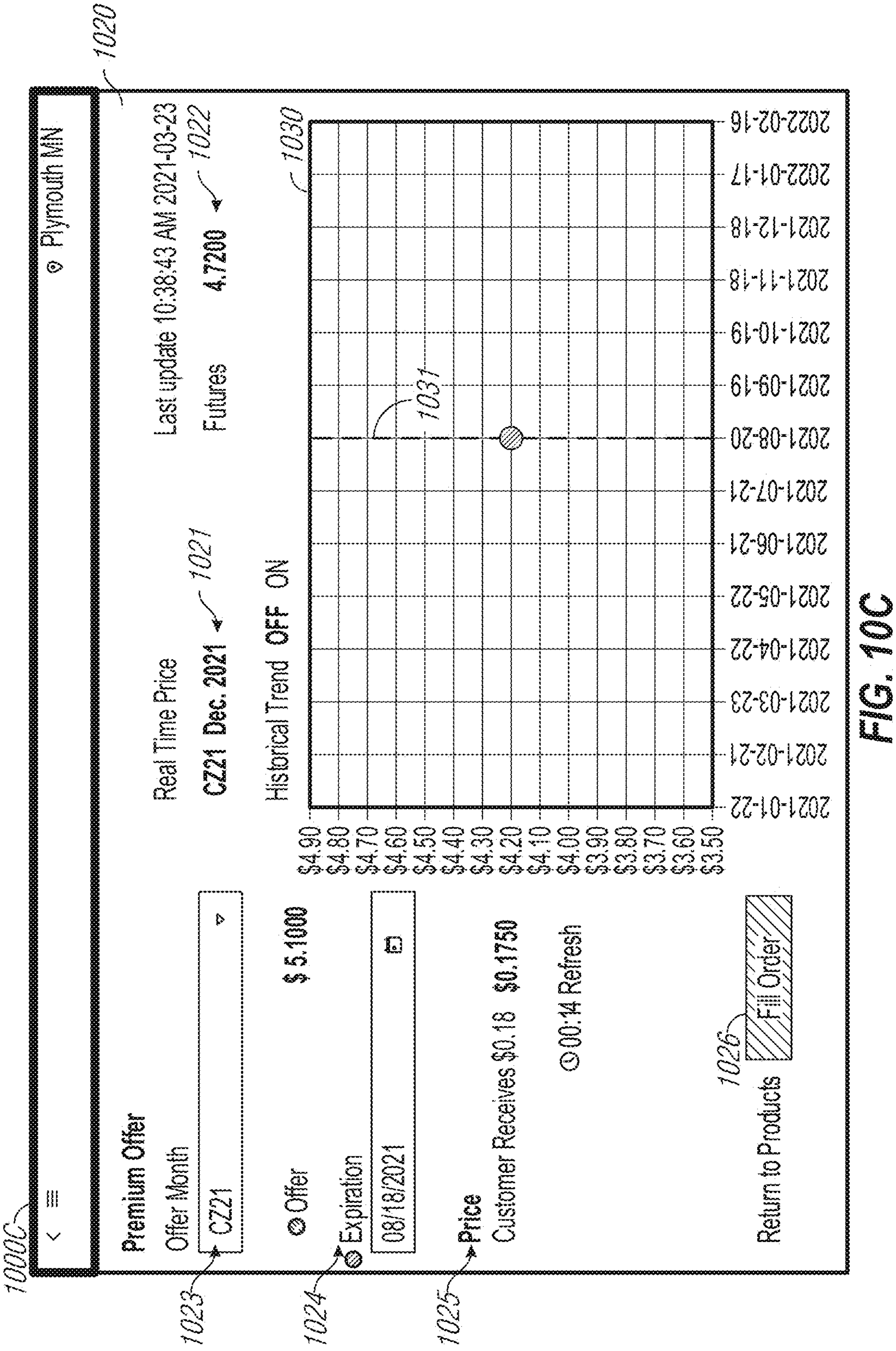

FIG. 10C continues with an illustration of a user interface view 1000C. Here, a new pricing solution for an existing contract can be specified with user interface screen 1020, based on quoting and selection of a particular pricing strategy to be tied to a futures contract using a "premium offer" pricing strategy. User interface screen 1020 includes an information display portion, providing futures contract information 1021, futures price information 1022, pricing strategy date information 1023, pricing strategy expiration date information 1024, and pricing strategy price 1025. The user interface screen 1020 also includes an interactive graph representation 1030, providing similar functionality as the interactive graph representations 730, 830, 930. Thus, a vertical user interface control provided by line 1031 can be moved to select different time values (expiration dates) which define a date applicable for the pricing strategy (e.g., to dynamically update pricing strategy expiration date information 1024). A user interface control 1026 (e.g., button or link) can be used to fill the order for the pricing strategy.

Figure 10D:
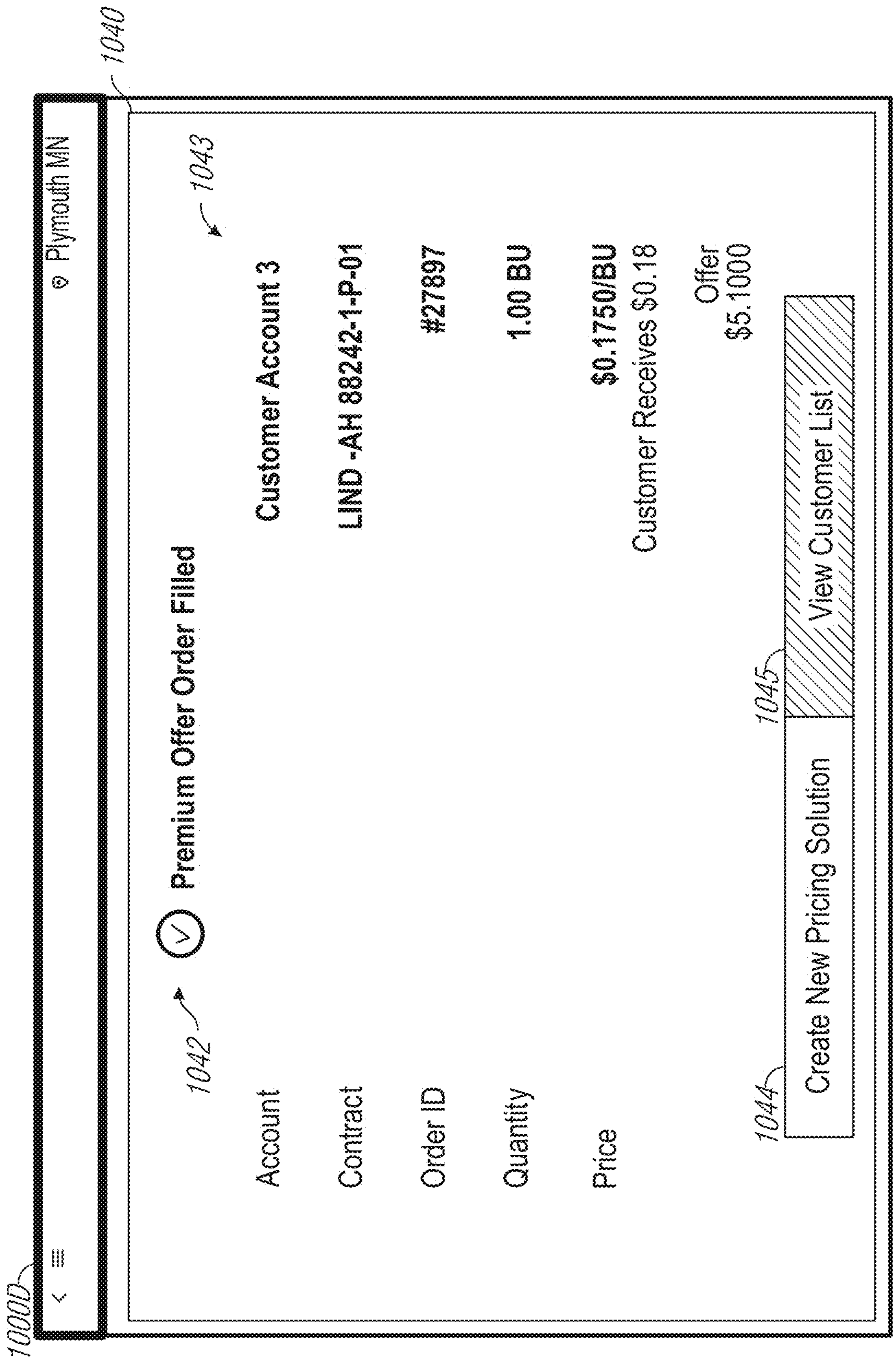

FIG. 10D includes an illustration of a user interface view 1000D, which includes a user interface screen 1040 providing status information to fill the order for the pricing strategy (e.g., established with the user interface screen 1020). Here, status information 1042 and customer information 1043 may indicate the results of the pricing solution, which may or may not be associated yet with a delivery contract. Additional user interface controls 1044, 1045 may provide other functionality in connection with contracts, pricing solutions, or customers.

Figure 10E:
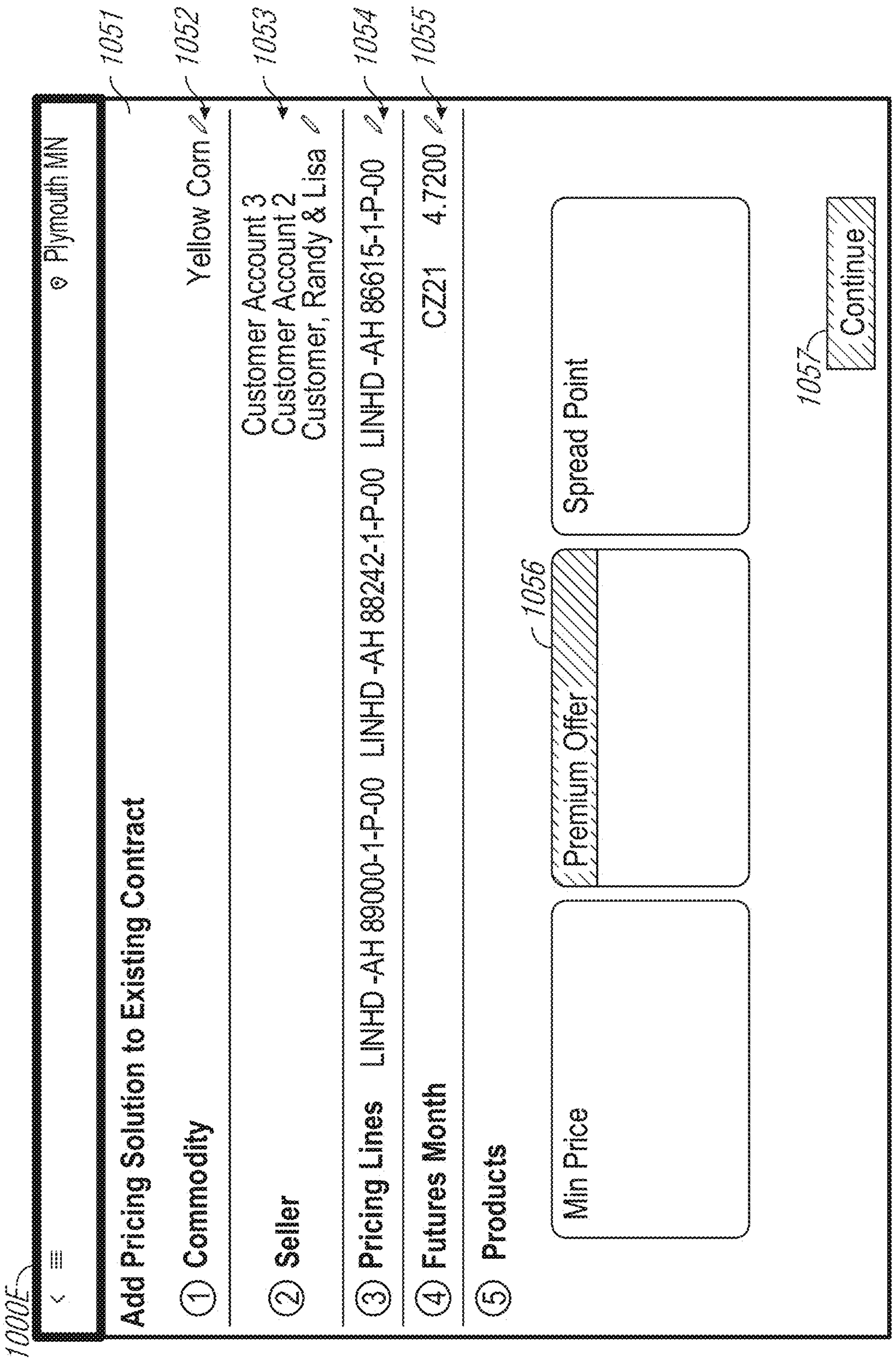

FIG. 10E includes an illustration of a user interface view 1000E, which provides functionality with user interface screen 1051 similar to that described for user interface screens 711, 811, 911, and 1011. However, because the contract has been specified, the selection of a contract causes information to be accessed and displayed from the contract, such as commodity information 1052, a listing of customers 1053, a listing of pricing lines 1054, futures information 1055, and user interface controls 1056, 1057. Here, the product selected is a "Premium Offer", illustrated on the next described screens.

Figure 10F:
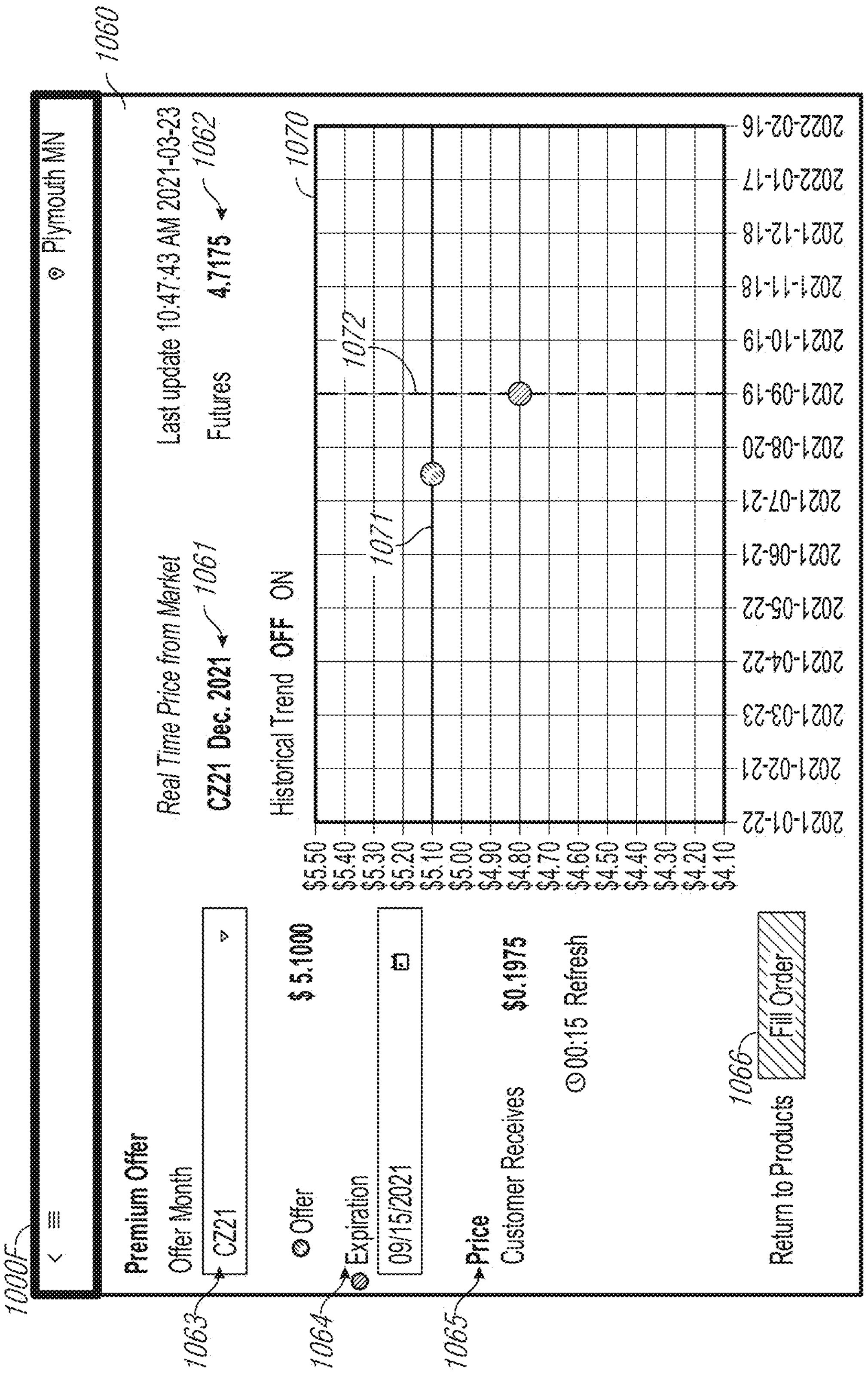

FIG. 10F includes an illustration of a user interface view 1000F, which provides functionality with user interface screen 1060 similar to that described for user interface screen 1020. User interface screen 1060 includes an information display portion, providing futures contract information 1061, futures price information 1062, pricing strategy date information 1063, pricing strategy expiration date information 1064, and pricing strategy price 1065. The user interface screen 1060 also includes an interactive graph representation 1070, providing similar functionality as the interactive graph representations 730, 830, 930, 1030. Thus, a vertical user interface control provided by line 1072 can be moved to select different time values (expiration dates) which define a date applicable for the pricing strategy (e.g., to dynamically update pricing strategy expiration date information 1064), and a horizontal user interface control provided by line 1071 can be moved to specify different offer values. A user interface control 1066 (e.g., button or link) can be used to fill the order for the pricing strategy.

Figure 10G:
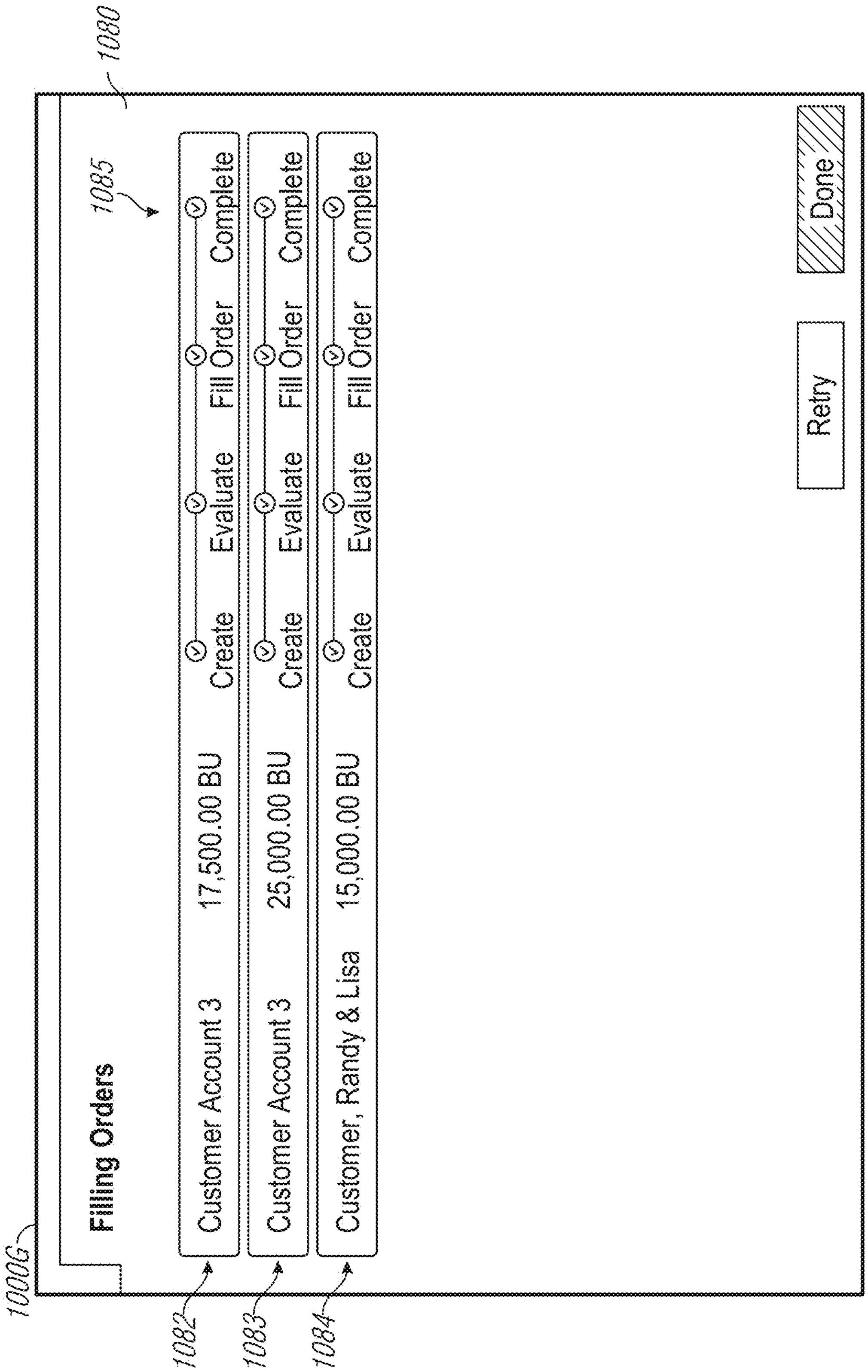

FIG. 10G includes an illustration of a user interface view 1000G, providing a user interface screen 1080 similar to screen 940 indicating a status 1085 of filling multiple orders of a pricing strategy for multiple prospective contracts. Here, listings 1082, 1083, 1084 of the selected pricing strategies and applicable customer accounts include status information (e.g., whether the pricing strategy is created, evaluated, whether the order is filled, and confirmed via market execution).

The various interactive graph representations 730, 830, 930, 1030, and 1070 were described above with reference to a "vertical axis" and a "horizontal axis", such as where the vertical axis corresponds to price values and the horizontal axis corresponds to time values, but it will be understood that such labels and designations are merely illustrative. It will be understood that in other examples, a vertical axis can correspond to time values and the horizontal axis can correspond to price values. Further, in other examples, at least two separate axes may be used, with different values being oriented orthogonally.

Also, the designation of the terms "horizontal" and "vertical", for the lines represented among the interactive graph representations 730, 830, 930, 1030, and 1070, are merely provided for purposes of illustration, and may equally be described by the terms "first", "second", "third", "fourth", and so forth. Other movable user interface controls and interactive components may also be used in combination or in substitution of the described lines.

Figure 11:
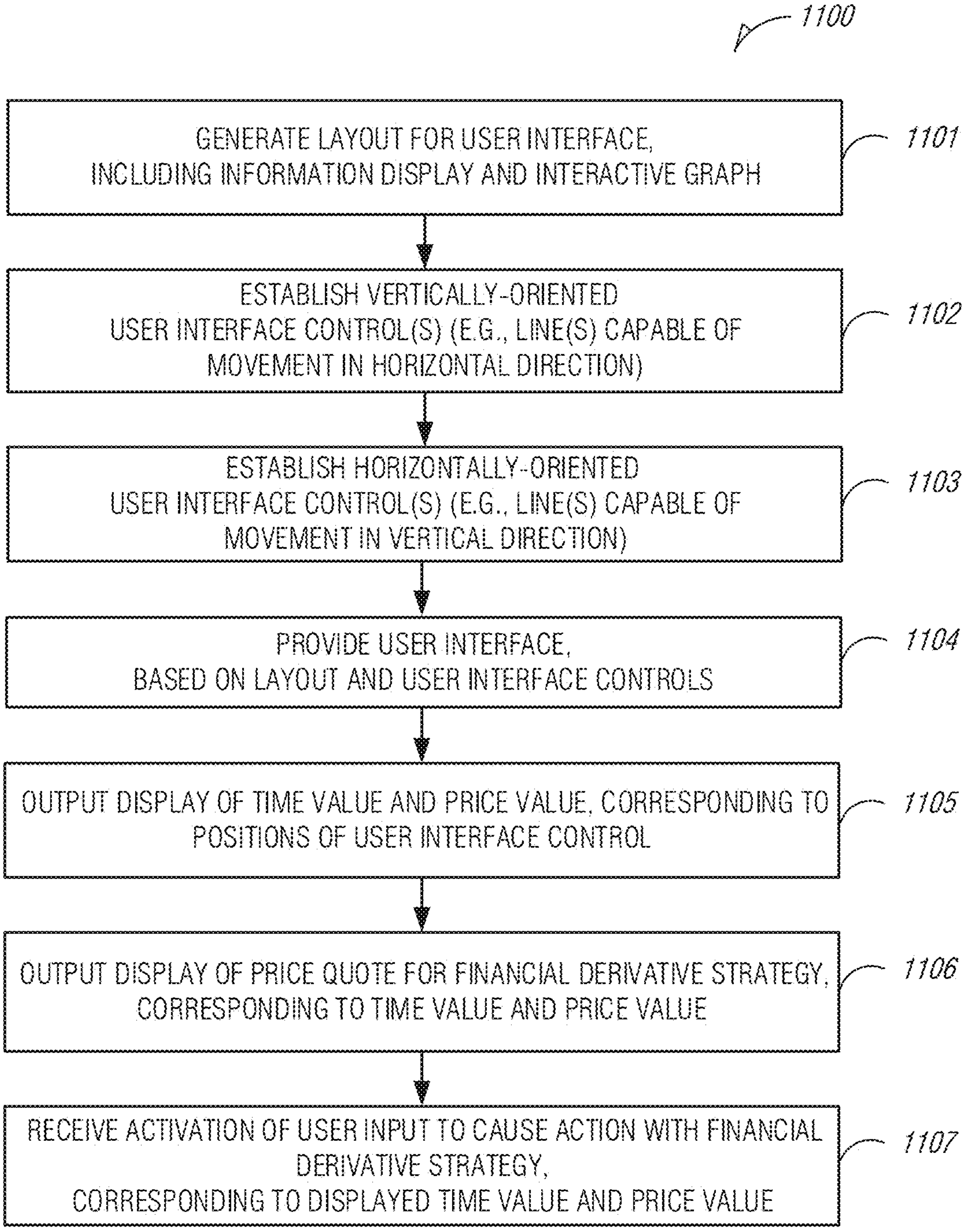
FIG. 11 illustrates a flowchart of a method performed by a computing system for establishing and providing user interface functionality for advanced pricing strategies of one or more commodity contracts.

FIG. 11 illustrates a flowchart of an example computer-implemented method 1100 performed by a computing system for establishing and providing user interface functionality for advanced pricing strategies of one or more commodity contracts. It will be understood that the following method 1100 may be implemented by a computing system, computer-readable storage medium having instructions to configure a computing system, and other systems and devices discussed herein.

Operation 1101 includes generating a layout for user interface, for a user interface including an information display and interactive graph. In an example, the information display includes a textual or graphical display of pricing characteristics, including price values and time values, for some proposed financial derivative strategy (also referred to herein as a "pricing strategy"). In this example, the interactive graph representation includes a textual or graphical display of a graph having a vertical axis and a horizontal axis, where the vertical axis corresponds to price values and the horizontal axis corresponds to time values of the financial derivative strategy.

Operation 1102 includes establishing one or more vertically-oriented user interface control(s), such as provided by one or more line(s) capable of movement in a horizontal direction. In an example, each vertical user interface control is a line perpendicular to the vertical axis which is capable of horizontal movement among multiple positions within the interactive graph representation, and a position of each vertical user interface control selects a time value associated with the financial derivative strategy.

Operation 1103 includes establishing horizontally-oriented user interface control(s), such as provided by one or more line(s) capable of movement in a vertical direction. In an example, each horizontal user interface control is a line perpendicular to the horizontal axis which is capable of vertical movement among multiple positions within the interactive graph representation, and a position of the horizontal user interface control selects a price value associated with the financial derivative strategy. (It will be understood that, in other examples, the values represented by the horizontal and vertical axis may be easily reversed, such that the horizontal axis corresponds to price values and the vertical axis corresponds to time values).

Operation 1104 includes providing a graphical user interface, based on the layout and user interface controls established or defined above. This graphical user interface may be provided via a mobile device software app, a standalone installed software executable, a website, or other mechanisms.

Operation 1105 includes outputting of a display of time value and price value, within the information display and other features of the user interface, with the display of the time value and price value corresponding to the user-selected positions of the user interface control(s) (e.g., the vertical and horizontal lines) or other input values in the user interface (e.g., text boxes).

Operation 1106 includes outputting a display of a price quote for the financial derivative strategy, within the information display and other features of the user interface, with such a display corresponding to the user-selected or user-input time value and price value. Consistent with the examples above, the price quote may be associated with an expiration time for activation (e.g., selection and purchase) of the financial derivative strategy.

Operation 1107 concludes the method 1100 by receiving an activation of user input (e.g., via a button or other selectable user interface control). This activation causes an action to be performed with a financial derivative strategy, that corresponds to the displayed time value and price value in the user interface. (For instance, to purchase or write an options contract of a financial derivative strategy that corresponds to the designated time value and price value). In a first example, user activation of a selectable user interface control (e.g., button or link) causes association of the financial derivative strategy with an existing delivery contract established for delivery of a particular commodity. In a second example, user activation of a selectable user interface control (e.g., button or link) causes association of the financial derivative strategy with a new delivery contract established for delivery of a particular commodity. In a third example, user activation of the selectable user interface control causes association of the financial derivative strategy with multiple existing delivery contracts (from one or more customers) established for delivery of a particular commodity.

Further operations (not shown in method 1100) may include mechanisms in which pricing information is updated, refreshed, or replaced. This may include the display of the price quote being followed by the display of an updated price quote to replace (refresh) the price quote, based on the user-selected or user-input time value and the price value. Consistent with the examples above, the updated price quote may be associated with a subsequent expiration time (e.g., selection and purchase) for activation of the financial derivative strategy at the updated price quote. The graphical user interface also may include a selectable user interface control (e.g., button or link) to obtain this updated price quote, such that the outputting of the updated price quote to replace the price quote is caused from user activation of the selectable user interface control. In other examples, outputting of an updated price quote to replace the price quote is caused from: user movement of the vertical user interface control within the interactive graph representation; user movement of the horizontal user interface control within the interactive graph representation; or elapsing of an expiration time.

Consistent with the example graphical user interface representations discussed above (for FIGS. 7A to 10G), aspects of the user interactivity may include use of the vertical and horizontal lines to select specific pricing strategy products.

In a first example user interface configuration: the vertical axis of the interactive graph representation is used to represent expiration dates for futures contracts of a particular commodity, as the at least one vertical user interface control is movable among respective positions for the expiration dates for the futures contracts; additionally, the horizontal axis of the interactive graph representation is used to represent strike prices for derivatives of the futures contracts, as the at least one horizontal user interface control is movable among respective strike prices for the derivatives of the futures contracts. Further, the at least one horizontal user interface control may include multiple horizontal user interface controls provided from multiple lines, as the multiple lines are used to represent respective prices of two or more derivative positions provided from among: a short call position, a long put position, or a short put position.

In a second example user interface configuration: the horizontal axis of the interactive graph representation is used to represent expiration dates for futures contracts of a particular commodity, and the vertical axis of the interactive graph representation is used to represent pricing values associated with a delivery contract for the particular commodity. Further, in a specific configuration, the at least one horizontal user interface control includes multiple horizontal user interface controls provided from four lines, the four lines respectively representing: a contingent offer price, a plus level price, a floor level price, and a trigger level price.

An implementation example of the method 1100 (or the further operations or user interface configurations) includes a non-transitory computer-readable storage medium, comprising instructions to provide a graphical user interface for customizing a financial derivative strategy associated with a commodity delivery contract, such that the instructions, when executed, configure hardware processing circuitry of a computing system to perform operations of method 1100 (and, related operations discussed above).

Another implementation example of the method 1100 (or the further operations or user interface configurations) includes a computing system, comprising: memory storing price strategy data comprising price values and time values associated with a financial derivative strategy, and contract data comprising information associated with a current or prospective commodity delivery contract; and processing circuitry configured to provide a graphical user interface for customizing the financial derivative strategy associated with the commodity delivery contract, by performing the operations of method 1100 (and, related operations discussed above).

Another implementation example of the method 1100 (or the further operations or user interface configurations) includes a cloud computing system, comprising: a communications device configured to perform communications with a client computing system using at least one application programming interface; a memory device configured to store instructions; and processing circuitry configured to execute the instructions, such that the instructions, when executed, cause the cloud computing system to host and operate the at least one application programming interface, the at one application programming interface to communicate data with the client computing system, to enable use of a graphical user interface at the client computing system for customizing a financial derivative strategy associated with a commodity delivery contract, according to the operations of method 1100 (and, related operations discussed above).

Another implementation example of the method 1100 (or the further operations or user interface configurations) includes a server computing system, comprising: a communications device configured to perform communications with a client computing system via a website hosted by the server computing system; a memory device configured to store instructions; and processing circuitry configured to execute the instructions, such that the instructions, when executed, cause the server computing system to host and operate the website, the website configured to provide a graphical user interface at the client computing system for customizing a financial derivative strategy associated with a commodity delivery contract, according to the operations of method 1100 (and, related operations discussed above).

Another implementation example of the method 1100 (or the further operations or user interface configurations) includes a client computing system, comprising: a communications device configured to perform communications with at least one application programming interface of a cloud computing system; a memory device configured to store instructions; and processing circuitry configured to execute the instructions, such that the instructions, when executed, cause the client computing system to access the at least one application programming interface of the cloud computing system, to obtain data used with a graphical user interface provided according to the operations of method 1100 (and, related operations discussed above).

Another implementation example of the method 1100 (or the further operations or user interface configurations) includes a client computing system, comprising: a display device; a memory device configured to store instructions; and processing circuitry configured to execute the instructions, such that the instructions, when executed, cause the client computing system to present a graphical user interface via the display device, and operate a graphical user interface for customizing a financial derivative strategy associated with a commodity delivery contract, according to the operations of method 1100 (and, related operations discussed above).

Another implementation example of the method 1100 (or the further operations or user interface configurations) includes an administrative user computing system, comprising: a storage device configured to store customer data; a memory device configured to store instructions; and processing circuitry configured to execute the instructions, such that the instructions, when executed, cause the administrative computing system to access and modify the customer data, the customer data established from use of a graphical user interface for customizing a financial derivative strategy associated with a commodity delivery contract, according to the operations of method 1100 (and, related operations discussed above).

Another implementation example of the method 1100 (or the further operations or user interface configurations) includes a commodity pricing strategy computing system, comprising: a storage device configured to store data associated with commodity derivative products; a memory device configured to store instructions; and processing circuitry configured to execute the instructions, such that the instructions, when executed, cause the commodity pricing strategy computing system to provide at least one application programming interface, to perform functions invoked from use of a graphical user interface for customizing a financial derivative strategy associated with a commodity delivery contract, according to the operations of method 1100 (and, related operations discussed above).

Another implementation example of the method 1100 (or the further operations or user interface configurations) includes a commodity contract computing system, comprising: a storage device configured to store data associated with commodity delivery contracts; a memory device configured to store instructions; and processing circuitry configured to execute the instructions, such that the instructions, when executed, cause the commodity contract computing system to provide at least one application programming interface, to perform functions invoked from use of a graphical user interface for customizing a commodity delivery contract associated with a financial derivative strategy, according to the operations of method 1100 (and, related operations discussed above).

Figure 12:
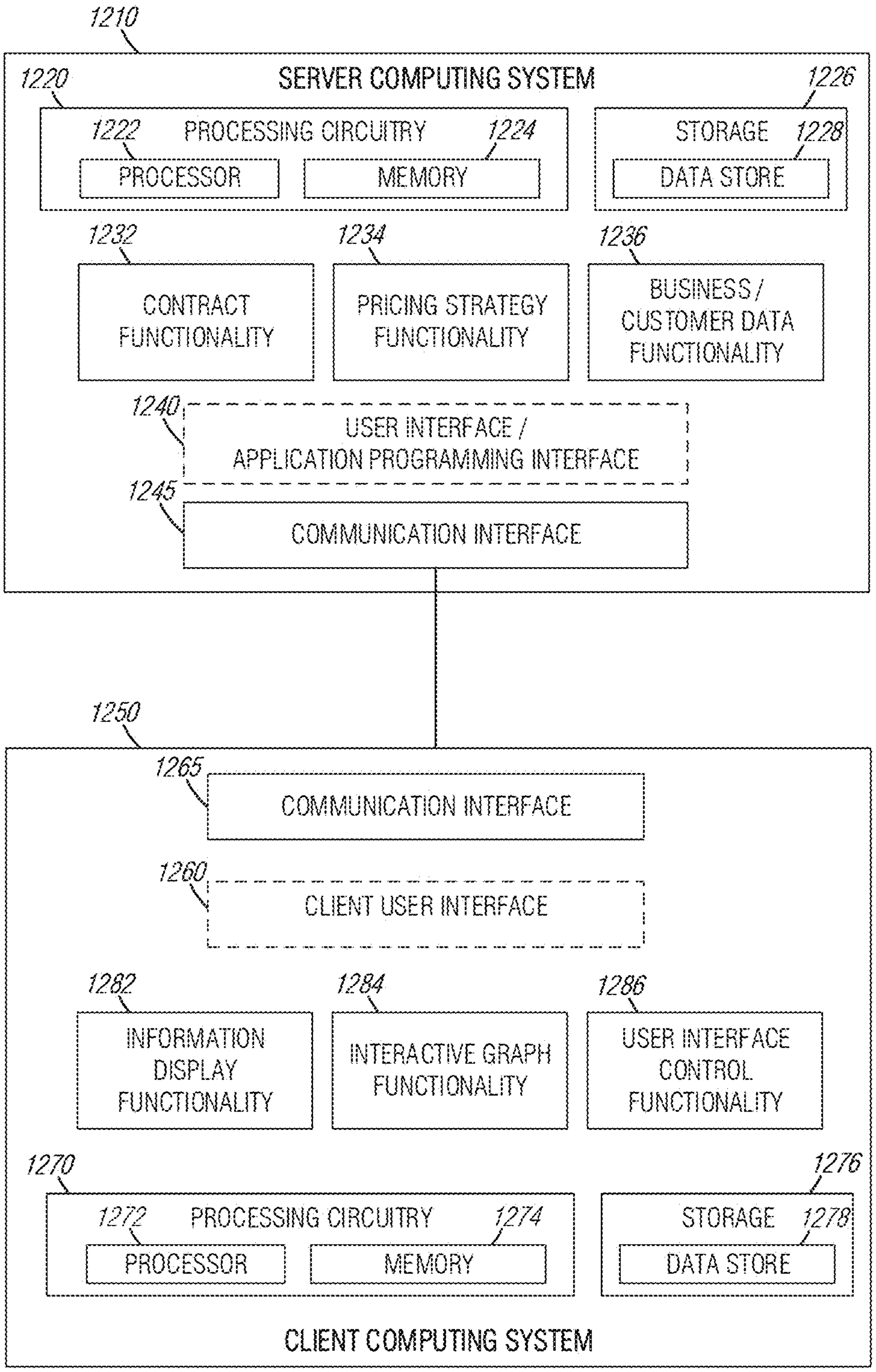
FIG. 12 illustrates a block diagram of a server and client computing system for implementing the computing and processing techniques discussed herein, according to an example.

FIG. 12 illustrates a block diagram of an example server data processing system 1210 and an example client computing system 1250 for implementing the computing and processing techniques discussed herein, according to an example. For instance, the server computing system 1210 may provide features of the cloud service 130, contract system 110, or pricing strategy system 120, and computing devices described thereto; the client computing system 1250 may provide features of the application user interface 140, the website user interface 150, and computing devices described thereto.

The computing systems 1210, 1250 may be operated by or embodied in a number of different computing platforms, such as in a server form factor, a workstation or personal computer form factor, a mobile computing device, etc., but are specifically illustrated with reference to server and client implementations. In some examples, the server system 1210 may be a networked device connected via a network (or combination of networks) to the client computing system 1250, with the server computing system operating an interface 1240 (in the form of a server-hosted user interface, or an application programming interface) that is communicatively coupled to the network with a communication interface 1245, and with the client computing system 1250 operating a client user interface 1260 that is communicatively coupled to the network with a communication interface 1265. The network may include local, short-range, or long-range networks, such as Bluetooth, cellular, IEEE 802.11 (Wi-Fi), or other wired or wireless networks.

The systems 1210, 1250 each include a processor 1222, 1272 and a memory 1224, 1274, which can be arranged as part of processing circuitry 1220, 1270. The processors 1222, 1272 respectively may be any single processor or group of processors that act cooperatively. The memory 1224, 1274 respectively may be any type of memory, including volatile or non-volatile memory. The memory 1224, 1274 on each respective system may include instructions (e.g., provided by storage 1226, 1276), which when executed by the processor 1222, 1272 cause the processor 1222, 1272 to implement the functional features described herein. This may include, for the server computing system 1210, contract functionality 1232, pricing strategy functionality 1234, business or customer data functionality 1236, or related processing features, to implement the functions or systems discussed above. This may include, for the client computing system 1250, information display functionality 1282, interactive graph functionality 1284, user interface control functionality 1286, or related processing features. This may also include the use or persisting of data with use of data stores (e.g., databases) 1228, 1278. Thus, it will be understood that the references to electronic operations in the systems 1210, 1250 or the processing circuitry 1220, 1270 may be performed by the respective processors 1222, 1272 or the circuitry 1220, 1270 as a whole. For example, the processors or circuitry may implement any of the features of the methods 300, 400, 1100 or functions described among the figures above, including those for operation of the user interfaces and application programming interfaces. The processors or circuitry may further provide (or obtain) data and commands to assist the processing and implementation using communication interfaces 1245, 1265.

Figure 13:
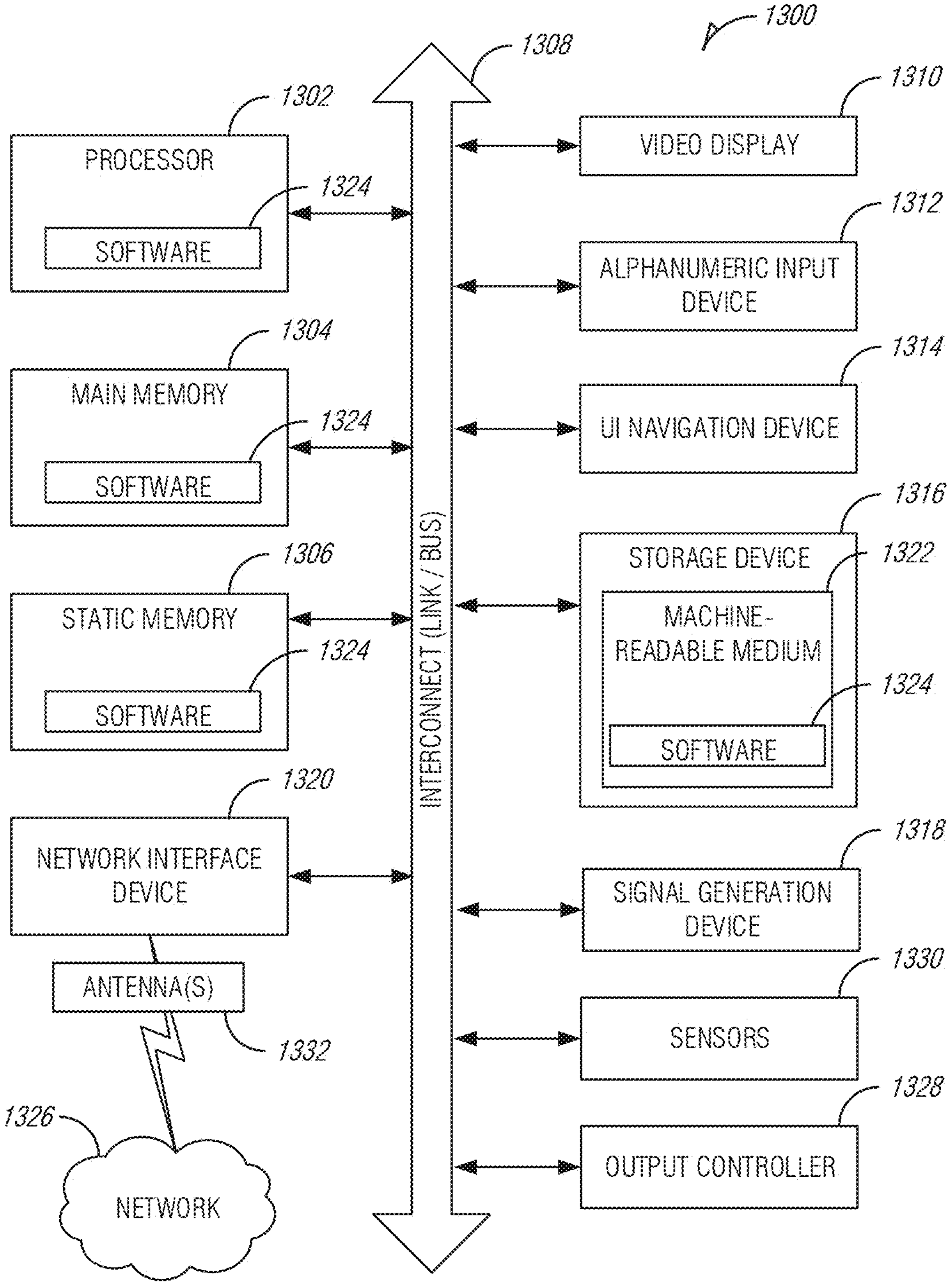
FIG. 13 illustrates a block diagram of an example computing machine upon which any one or more of the techniques or methodologies discussed herein may be implemented.

FIG. 13 illustrates a block diagram of an example computing system machine 1300 upon which any one or more of the techniques (e.g., methodologies) discussed herein may perform. Machine 1300 (e.g., computer system) may include a hardware processor 1302 (e.g., a central processing unit (CPU), a graphics processing unit (GPU), a hardware processor core, or any combination thereof), a main memory 1304 and a static memory 1306, connected via an interconnect 1308 (e.g., link or bus), as some or all of these components may constitute hardware for systems 110, 120, 130, or hardware to operate the interfaces 140 and 150 and related implementations discussed above.

Specific examples of main memory 1304 include Random Access Memory (RAM), and semiconductor memory devices, which may include, in some embodiments, storage locations in semiconductors such as registers. Specific examples of static memory 1306 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1300 may further include a display device 1310, an input device 1312 (e.g., a keyboard), and a user interface (UI) navigation device 1314 (e.g., a mouse). In an example, the display device 1310, input device 1312 and UI navigation device 1314 may be a touch screen display. The machine 1300 may additionally include a mass storage device 1316 (e.g., drive unit), a signal generation device 1318 (e.g., a speaker), a network interface device 1320, and one or more sensors 1330, such as a global positioning system (GPS) sensor, compass, accelerometer, or some other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 1302 and/or instructions 1324 may comprise processing circuitry and/or transceiver circuitry.

The mass storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the mass storage device 1316 constitutes, in at least some embodiments, machine readable media.

Specific examples of machine readable media include, one or more of non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks. While the machine readable medium 1322 is illustrated as a single medium, the term "machine readable medium" includes, in at least some embodiments, a single medium or multiple media (e.g., a centralized or distributed database, and/or associated caches and servers) configured to store the one or more instructions 1324.

An apparatus of the machine 1300 includes, in at least some embodiments, one or more of a hardware processor 1302 (e.g., a central processing unit (CPU), a graphics processing unit (GPU), a hardware processor core, or any combination thereof), a main memory 1304 and a static memory 1306, sensors 1330, network interface device 1320, antennas 1332, a display device 1310, an input device 1312, a UI navigation device 1314, a mass storage device 1316, instructions 1324, a signal generation device 1318, and an output controller 1328. The apparatus is configured, in at least some embodiments, to perform one or more of the methods and/or operations disclosed herein. The apparatus is, in some examples, a component of the machine 1300 to perform one or more of the methods and/or operations disclosed herein, and/or to perform a portion of one or more of the methods and/or operations disclosed herein. In some examples, the apparatus includes, in some embodiments, a pin or other means to receive power. In some embodiments, the apparatus includes power conditioning hardware.

The term "machine readable medium" includes, in some embodiments, any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples include solid-state memories, and optical and magnetic media. Specific examples of machine readable media include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media includes non-transitory machine readable media. In some examples, machine readable media includes machine readable media that is not a transitory propagating signal.

The instructions 1324 are further transmitted or received, in at least some embodiments, over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) 4G or 5G family of standards, a Universal Mobile Telecommunications System (UMTS) family of standards, peer-to-peer (P2P) networks, satellite communication networks, among others.

In an example embodiment, the network interface device 1320 includes one or more physical jacks (e.g., Ethernet, coaxial, or phone jacks) or one or more antennas to connect to the communications network 1326. In an example embodiment, the network interface device 1320 includes one or more antennas 1332 to wirelessly communicate using at least one of single-input multiple-output (SIMO), multiple-input multiple-output (MIMO), or multiple-input single-output (MISO) techniques. In some examples, the network interface device 1320 wirelessly communicates using Multiple User MIMO techniques. The term “transmission medium” shall be taken to include any intangible medium that is capable of storing, encoding or carrying instructions for execution by the machine 1300, and includes digital or analog communications signals or other intangible medium to facilitate communication of such software.

At least some example embodiments, as described herein, include, or operate on, logic or a number of components, modules, or mechanisms. Such components are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a component that operates to perform specified operations. In an example, the software resides on a machine readable medium. In an example, the software, when executed by the underlying hardware of the component, causes the hardware to perform the specified operations.

Accordingly, such components are understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software, in some embodiments, the general-purpose hardware processor is configured as respective different components at different times. Software accordingly configures a hardware processor, for example, to constitute a particular component at one instance of time and to constitute a different component at a different instance of time.

Some embodiments are implemented fully or partially in software and/or firmware. This software and/or firmware takes the form of instructions contained in or on a non-transitory computer-readable storage medium, in at least some embodiments. Those instructions are then read and executed by one or more hardware processors to enable performance of the operations described herein, in at least some embodiments. The instructions are in any suitable form, such as but not limited to source code, compiled code, interpreted code, executable code, static code, dynamic code, and the like. Such a computer-readable medium includes any tangible non-transitory medium for storing information in a form readable by one or more computers, such as but not limited to read only memory (ROM); random access memory (RAM); magnetic disk storage media; optical storage media; flash memory, etc.

Various embodiments may be implemented fully or partially in software and/or firmware. This software and/or firmware may take the form of instructions contained in or on a non-transitory computer-readable storage medium. Those instructions are then read and executed by one or more processors to enable performance of the operations described herein. The instructions are in any suitable form, such as but not limited to source code, compiled code, interpreted code, executable code, static code, dynamic code, and the like. Such a computer-readable medium includes, in at least some embodiments, any tangible non-transitory medium for storing information in a form readable by one or more computers, such as but not limited to read only memory (ROM); random access memory (RAM); magnetic disk storage media; optical storage media; flash memory, etc.

What is claimed is:

1. A computing system, comprising:

memory storing:

price strategy data comprising price values and time values associated with a financial derivative strategy; and contract data comprising information associated with a current or prospective commodity delivery contract; and processing circuitry configured to provide a graphical user interface for customizing the financial derivative strategy associated with the commodity delivery contract, by performing operations to:

simultaneously access a contract processing system and a pricing system; provide a first user interface control within the graphical user interface, the first user interface control configured to allow selection of a time value associated with the financial derivative strategy;

provide a second user interface control within the graphical user interface, the second user interface control configured to allow selection of a price value associated with the financial derivative strategy;

output, in the graphical user interface, a price quote corresponding to the financial derivative strategy, the price quote obtained from the pricing system based on a position of the first user interface control and a position of the second user interface control, the price quote associated with an expiration time for activation of the financial derivative strategy;

dynamically update the expiration time to a subsequent expiration time for activation of the financial derivative strategy based on the position of the second user interface control; and access the contract processing system performing at least one of creating and updating a commodity delivery contract based on the subsequent expiration time.

2. The computing system of claim 1, wherein the processing circuitry is configured to output, in the graphical user interface, an updated price quote replacing the price quote, based on the time value and the price value, wherein the updated price quote is associated with the subsequent expiration time.

3. The computing system of claim 2, wherein the processing circuitry is configured to update the commodity delivery contract based on the updated price quote.

4. The computing system of claim 2, wherein the graphical user interface further provides a selectable user interface control to obtain the updated price quote, wherein the outputting of the updated price quote to replace the price quote is caused from user activation of the selectable user interface control.

5. The computing system of claim 2, wherein the outputting of the updated price quote to replace the price quote is caused from one or more of user movement of the first user interface control, user movement of the second user interface control, and elapsing of the expiration time.

6. The computing system of claim 1, wherein the processing circuitry is further configured to provide an interactive graph representation of the graphical user interface, and wherein the first user interface control controls movement along a first axis of the interactive graph representation, and the second user interface control controls movement along a second axis of the interactive graph representation.

7. The computing system of claim 6, wherein the first axis represents expiration dates for futures contracts of a particular commodity, the first user interface control being movable among respective positions for the expiration dates for the futures contracts, wherein the second axis represents strike prices for derivatives of the futures contracts, the second user interface control being movable among respective strike prices for the derivatives of the futures contracts.

8. The computing system of claim 1, wherein the first user interface control includes multiple first user interface controls provided from multiple lines, the multiple lines representing respective prices of two or more derivative positions provided from among: a short call position, a long put position, or a short put position.

9. The computing system of claim 1, wherein the second user interface control includes multiple second user interface controls provided from four lines, the four lines respectively representing: a contingent offer price, a plus level price, a floor level price, and a trigger level price.

10. The computing system of claim 1, wherein the graphical user interface further comprises a selectable user interface control for the activation of the financial derivative strategy, wherein user activation of the selectable user interface control causes association of the financial derivative strategy with an existing delivery contract established for delivery of a particular commodity.

11. The computing system of claim 1, wherein the graphical user interface further comprises a selectable user interface control for the activation of the financial derivative strategy and a user interface input to specify one or more customers or contracts, wherein user activation of the selectable user interface control causes association of the financial derivative strategy with multiple existing delivery contracts established for delivery of a particular commodity.

12. The computing system of claim 1, wherein the graphical user interface further comprises a selectable user interface control for the activation of the financial derivative strategy, wherein activation of the selectable user interface control causes association of the financial derivative strategy with a new delivery contract established for delivery of a particular commodity.

13. A computer-implemented method for providing a graphical user interface to customize a financial derivative strategy associated with a commodity delivery contract, comprising:

simultaneously accessing a contract processing system and a pricing system;

providing a first user interface control within the graphical user interface, the first user interface control configured to allow selection of a time value associated with the financial derivative strategy;

providing a second user interface control within the graphical user interface, the second user interface control configured to allow selection of a price value associated with the financial derivative strategy;

outputting, in the graphical user interface, a price quote corresponding to the financial derivative strategy, the price quote obtained from the pricing system based on a position of the first user interface control and a position of the second user interface control, the price quote associated with an expiration time for activation of the financial derivative strategy;

dynamically updating the expiration time to a subsequent expiration time for activation of the financial derivative strategy based on the position of the second user interface control; and accessing the contract processing system performing at least one of creating and updating a commodity delivery contract based on the subsequent expiration time.

14. The computer-implemented method of claim 13, further comprising outputting, in the graphical user interface, an updated price quote replacing the price quote, based on the time value and the price value, wherein the updated price quote is associated with the subsequent expiration time.

15. The computer-implemented method of claim 14, further comprising updating the commodity delivery contract based on the updated price quote.

16. The computer-implemented method of claim 14, further comprising providing a selectable user interface control to obtain the updated price quote, wherein the outputting of the updated price quote to replace the price quote is caused from user activation of the selectable user interface control.

17. The computer-implemented method of claim 14, wherein the outputting of the updated price quote to replace the price quote is caused from one or more of user movement of the first user interface control, user movement of the second user interface control within the graphical user interface, and elapsing of the expiration time.

18. The computer-implemented method of claim 13, further comprising providing an interactive graph representation of the graphical user interface, wherein:

the first user interface control controls movement between multiple positions along a first axis of the interactive graph representation; and the second user interface control controls movement between multiple positions along a second axis of the interactive graph representation, a position of the first user interface control selects the time value associated with the financial derivative strategy and a position of the second user interface control selects the price value associated with the financial derivative strategy.

19. The computer-implemented method of claim 18, wherein the first axis represents expiration dates for futures contracts of a particular commodity, the first user interface control being movable among respective positions for the expiration dates for the futures contracts, wherein the second axis represents strike prices for derivatives of the futures contracts, the second user interface control being movable among respective strike prices for the derivatives of the futures contracts.

20. A non-transitory computer-readable storage medium comprising instructions to provide a graphical user interface for customizing a financial derivative strategy associated with a commodity delivery contract, wherein the instructions, when executed, configure hardware processing circuitry of a computing system to perform operations comprising:

simultaneously accessing a contract processing system and a pricing system;

providing a first user interface control within the graphical user interface, the first user interface control configured to allow selection of a time value associated with the financial derivative strategy;

providing a second user interface control within the graphical user interface, the second user interface control configured to allow selection of a price value associated with the financial derivative strategy;

outputting, in the graphical user interface, a price quote corresponding to the financial derivative strategy, the price quote obtained from the pricing system based on a position of the first user interface control and a position of the second user interface control, the price quote associated with an expiration time for activation of the financial derivative strategy;

dynamically updating the expiration time to a subsequent expiration time for activation of the financial derivative strategy based on the position of the second user interface control; and accessing the contract processing system performing at least one of creating and updating a commodity delivery contract based on the subsequent expiration time.

* * * * *